United States Patent
Ruzicka et al.

(10) Patent No.: US 10,503,124 B2
(45) Date of Patent: Dec. 10, 2019

(54) AUTOMATIC TIME ZONE DETECTION IN DEVICES

(71) Applicant: Microsoft Technology Licensing, LLC, Redmond, WA (US)

(72) Inventors: Ronald S. Ruzicka, Issaquah, WA (US); Ken M. Sadahiro, Redmond, WA (US); Axel Andrejs, Sammamish, WA (US); Matthew D. Johnson, Woodinville, WA (US); Gregory R. Slayden, Kirkland, WA (US); Wen Li Looi, Calgary (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 877 days.

(21) Appl. No.: 14/937,637

(22) Filed: Nov. 10, 2015

(65) Prior Publication Data

US 2017/0123382 A1    May 4, 2017

Related U.S. Application Data

(60) Provisional application No. 62/249,228, filed on Oct. 31, 2015.

(51) Int. Cl.
*H04W 24/00* (2009.01)
*G04G 9/00* (2006.01)
(Continued)

(52) U.S. Cl.
CPC ........... *G04G 9/0076* (2013.01); *G04R 20/00* (2013.01); *H04W 4/021* (2013.01)

(58) Field of Classification Search
CPC ...... G04G 9/0076; G04R 20/00; G04R 20/06; H04W 4/021
(Continued)

(56) References Cited

U.S. PATENT DOCUMENTS

| 5,089,814 A | 2/1992 | DeLuca et al. |
| 6,278,660 B1 | 8/2001 | Tognazzini |

(Continued)

FOREIGN PATENT DOCUMENTS

| CN | 103039115 A | 4/2013 |
| CN | 104394509 A | 3/2015 |

(Continued)

OTHER PUBLICATIONS

Curran, et al., "Integrating geolocation into electronic finance applications for additional security", In International Journal of Electronic Finance, vol. 5, No. 3, Jul. 2011, pp. 272-285.
(Continued)

*Primary Examiner* — Vu A Le
(74) *Attorney, Agent, or Firm* — Fiala & Weaver P.L.L.C.

(57) ABSTRACT

Methods, systems, apparatuses, and computer program products are provided for enabling devices to determine the time zone in which they are located. A mobile device may receive location information from one or more sources. Based thereon, the current location of the mobile device may be determined in terms of latitude and longitude. The indication of the current location may be converted to an index value according to a Hilbert curve (or other space-filling curve), and the index value applied to a time zone index file to determine the local time zone. A time zone setting of the mobile device may be updated accordingly. Furthermore, "geofencing" may be used by the mobile device to detect movement towards and through a time zone boundary, leading to a new time zone determination being initiated.

20 Claims, 11 Drawing Sheets

(51) Int. Cl.
  *G04R 20/00* (2013.01)
  *H04W 4/021* (2018.01)
(58) Field of Classification Search
  USPC .................. 702/178; 455/456.1, 412.2, 502
  See application file for complete search history.

(56) References Cited

U.S. PATENT DOCUMENTS

| | | | |
|---|---|---|---|
| 7,633,389 B2 | 12/2009 | Mantovani et al. | |
| 7,684,782 B2 | 3/2010 | Ashley, Jr. et al. | |
| 8,290,489 B2* | 10/2012 | Ali | H04W 4/02 455/435.1 |
| 8,301,169 B2* | 10/2012 | Hung | H04L 51/043 455/404.2 |
| 8,331,200 B1 | 12/2012 | Luo et al. | |
| 8,620,345 B2 | 12/2013 | Huang et al. | |
| 8,768,348 B2* | 7/2014 | Stuempert | H04W 8/245 368/13 |
| 8,903,422 B2 | 12/2014 | Baudino et al. | |
| 8,983,494 B1* | 3/2015 | Onnen | H04W 4/02 455/422.1 |
| 9,134,427 B2 | 9/2015 | McIntosh | |
| 2008/0089313 A1 | 4/2008 | Cayo et al. | |
| 2010/0255824 A1* | 10/2010 | Shih | H04W 36/385 455/414.1 |
| 2010/0265802 A1 | 10/2010 | Lai | |
| 2011/0250902 A1* | 10/2011 | Huang | H04W 4/02 455/456.1 |
| 2013/0144522 A1* | 6/2013 | Irie | G01C 21/3667 701/430 |
| 2015/0169628 A1 | 6/2015 | Maennel | |
| 2015/0244819 A1 | 8/2015 | Duleba et al. | |
| 2015/0256975 A1 | 9/2015 | Wilson et al. | |

FOREIGN PATENT DOCUMENTS

| | | |
|---|---|---|
| EP | 2065768 A2 | 6/2009 |
| WO | 2010109306 A1 | 9/2010 |

OTHER PUBLICATIONS

Sundaramurthy, et al., "Wi-Fi Assistance to SUPL-based Assisted-GPS Simulators for Indoor Positioning", In Proceedings of IEEE Consumer Communications and Networking Conference, Jan. 9, 2011, pp. 918-922.
Barbeau, et al., "Dynamic Management of Real-Time Location Data on GPS-Enabled Mobile Phones", In Proceedings of the Second International Conference on Mobile Ubiquitous Computing, Systems, Services and Technologies, Sep. 29, 2008, pp. 343-348.
Bareth, et al., "Energy-Efficient Position Tracking in Proactive Location-Based Services for Smartphone Environments", In Proceedings of 35th IEEE Annual Computer Software and Applications Conference, Jul. 18, 2011, pp. 516-521.
Zandbergen, Paul A., "Accuracy of iPhone Locations: A Comparison of Assisted GPS, WiFi and Cellular Positioning", In Journal of Transactions in GIS, vol. 13, Issue Supplement s1, Jun. 2009, pp. 5-26.
Taylor, et al., "Bringing location to IP Addresses with IP Geolocation", In Journal of Emerging Technologies in Web Intelligence, vol. 4, No. 3, Aug. 2012, pp. 273-277.
"International Search Report and Written Opinion Issued in PCT Application No. PCT/US2016/058423", dated Jan. 4, 2017, 12 Pages.
Microsoft, "Find a Location by Point", Online available at <https://msdn.microsoft.com/en-us/library/f1101710.aspx>, retrieved on Oct. 30, 2015, 8 pages.
Geolocation—Stack Overflow, "How to get a time zone from a location using latitude and longitude coordinates?", Online available at <http://stackoverflow.com/questions/16086962/how-to-get-a-time-zone-from-a-location-using-latitude-and-longitude-coordinates/16086964>, retrieved on Oct. 30, 2015, 9 pages.
Nick Johnson, "Algorithm of the Week: Spatial Indexing with Quadtrees and Hilbert Curves", Online available at <https://dzone.com/articles/algorithm-week-spatial>, retrieved on Oct. 30, 2015, 8 pages.
API, "Look up a time zone by latitude and longitude coordinates, or by time zone id", Online available at <http://www.tzdata.org/Home/API>, retrieved on Oct. 30, 2015, 2 pages.
Google, "The Google Maps Time Zone API", Online available at <https://developers.google.com/maps/documentation/timezone/intro>, retrieved on Oct. 30, 2015, 8 pages.
Github, "mj1856/GeoTimeZone", Online available at <https://github.com/mj1856/GeoTimeZone>, retrieved on Nov. 10, 2015, 2 pages.
Geonames, "Web Services Documentation", Online available at <http://www.geonames.org/export/web-services.html>, retrieved on Oct. 30, 2015, 8 pages.
Askgeo, "Location to Information", Online available at <https://askgeo.com/>, retrieved on Oct. 30, 2015, 54 pages.
Geolocation—Stack Overflow, "How to get a time zone from a location using latitude and longitude coordinates?", Online available at <http://stackoverflow.com/questions/16086962/how-to-get-a-time-zone-from-a-location-using-latitude-and-longitude-coordinates/16086964>, retrieved on Nov. 10, 2015, 9 pages.
"First Office Action and Search Report Issued in Chinese Patent Application No. 201680064096.5", dated Sep. 25, 2019, 13 Pages.

* cited by examiner

AUTOMATIC TIME ZONE DETECTION IN DEVICES

CROSS REFERENCE TO RELATED APPLICATIONS

This application claims the benefit of U.S. Provisional Application No. 62/249,228, filed on Oct. 31, 2015, titled "Automatic Time Zone Detection in Devices," which is incorporated by reference herein in its entirety.

BACKGROUND

Numerous time zones segment the world, with each time zone being a region that observes its own uniform standard time for legal, commercial, and social purposes. A clock must be set to correspond to the time zone in which it resides to show correct time for that time zone, especially if the clock is required to update itself for daylight saving time at the correct date and time applicable in the region.

Mobile devices typically include electronic clocks. Many mobile devices do not have the ability to automatically determine the time zone in which the mobile devices are located. Some mobile devices attempt to determine their time zone using Network Identity & Time Zone (NITZ) data, which can be unreliable or unavailable in many locations around the world.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer program products are provided for enabling devices to determine the time zone in which they reside. Initially, a time zone index file is generated. Map data is received defining a world map as an array of polygons with associated time zones. A time zone identifier array is determined based on the map data that includes a time zone identifier for each time zone. For each time zone, each polygon of the array of polygons included in the time zone is analyzed to generate a set of cells associated with the time zone, thereby generating a plurality of sets of cells associated with the time zones. Duplicate cell entries are eliminated in the plurality of sets of cells associated with the time zones. A time zone index file is generated that includes the plurality of sets of cells with corresponding time zone identifiers.

The time zone index file is provided to a computing device, such as a mobile user device, for use in determining a local time zone. Location information is determined that indicates a location of the mobile user device. A space-filling curve is applied to the location information to generate an index value. The index value is applied to the index file to determine a time zone for the location of the mobile user device. A time zone setting of the mobile user device is updated according to the determined time zone.

The time zone for the mobile user device may be updated based on movements of the mobile user device. Location information that indicates a first location of the mobile user device is received. A first movement threshold region is determined, which is a portion of a first time zone polygon containing the first location of the mobile user device. Movement of the mobile user device is monitored within the first movement threshold region. A position change event is triggered based on an edge of the first movement threshold region being reached by the mobile user device. In response to the event, if the mobile user device is determined to have reached an edge of the first time zone polygon, an updated time zone is determined. Note that other types of triggers may be used (in addition to, or alternatively to movement), including device power-on or wake up, turning on the time zone determination feature, screen-on/wakeup, and exiting airplane mode.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
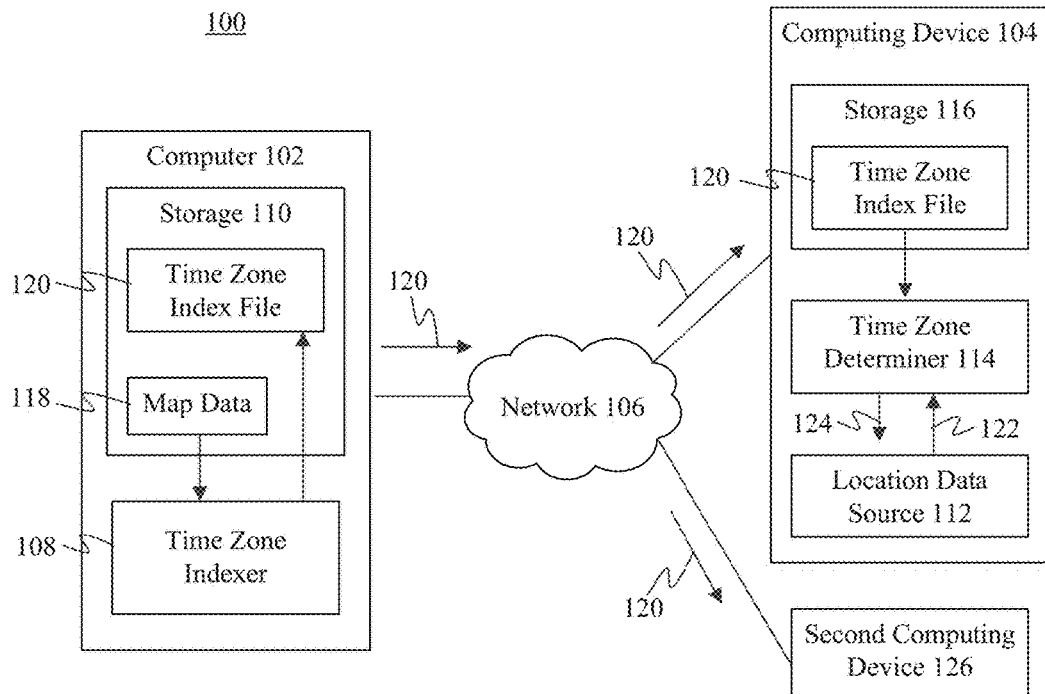
FIG. 1 shows a block diagram of communication system in which a time zone index file is generated for use by computing devices to determine local time zones, according to an example embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the present invention. The scope of the present invention is not limited to the disclosed embodiments. The disclosed embodiments merely exemplify the present invention, and modified versions of the disclosed embodiments are also encompassed by the present invention. Embodiments of the present invention are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments for Time Zone Determination

Numerous time zones segment the world, with each time zone being a region that observes its own uniform standard time for legal, commercial, and social purposes. A clock must be set to correspond to the time zone in which it resides to show correct time for that time zone.

Mobile devices typically include electronic clocks. Many mobile devices do not have the ability to determine automatically the time zone in which the mobile devices are located. Some mobile devices attempt to determine their time zone using Network Identity & Time Zone (NITZ) data, which can be unreliable or unavailable in many locations around the world.

NITZ is not always available, and it not always set correctly by the carrier or cell tower owner when it is available. Even when NITZ is set correctly, it only describes the time zone in terms of (1) a base offset from UTC (coordinated universal time) and (2) a DST (daylight savings time) bias if DST is currently in effect. In general, a "time zone" is not the same as a "time zone offset," and NITZ does not reflect that correctly. For example, NITZ may return 120 for the offset minutes and 60 for the DST minutes, which means it is normally UTC+02:00, and currently is UTC+03:00 for DST. Unfortunately, this is not enough to disambiguate the Eastern European Time zone used by EU (European Union) member countries from the slightly different rules used in Israel (for example). Many different countries use the +2/+3 pair with slightly different DST rules. Additionally, when DST is not in effect, NITZ just supplies 0 for the DST bias. Furthermore, NITZ signals from one time zone can sometimes be picked up from users in another, when near a border.

According to embodiments, a time zone index file is generated that may be used by mobile devices to determine a time zone in which they are located. The time zone index file is generated to be compact, and thereby not consume an excessive amount of memory on a mobile device. The time zone index file may be generated based on various levels of granularity (e.g., larger or smaller cells making up a world grid), resulting in the time zone index file being correspondingly sized (e.g., smaller or larger). A mobile device may receive location information from one or more sources, such as GPS (global positioning system), IP address, and/or WiFi. Based thereon, heuristic calculations may be performed to determine the current location of the mobile device in terms of latitude and longitude. The indication of the current location may be transformed according to a space-filling curve and applied to the time zone index file to determine the local time zone. A time zone setting of the mobile device may be updated to the determined local time zone, so that a clock of the mobile device can correctly show local time. To reduce battery consumption on a mobile device, "geofencing" may be used by the mobile device to detect movement towards and through a time zone boundary, leading to a new time zone determination being made.

Furthermore, embodiments enable offline determination of the time zone. A mobile device can determine its location using its own location determining resources (e.g., GPS, etc.), and the local time zone may be determined based thereon. No external service need be called to provide location information or anything else. The time zone determination at the mobile device is self-contained.

Still further, embodiments enable privacy to be maintained. A mobile device user can be assured that the time zone determination will not result in their location information being leaked from the mobile device. The time zone determination can be made even when the mobile device is not network connected (e.g., connected to the Internet). No network data connectivity is required to determine the local time zone.

Embodiments may be implemented in various environments. For instance, FIG. 1 shows a block diagram of communication system 100 in which a time zone index file is generated for use by computing devices to determine local time zones, according to an example embodiment. As shown in FIG. 1, communication system 100 includes a computer 102, a first computing device 104, and a second computing device 126. A network 106 communicatively couples sever 102 with computing devices 104 and 126. Computer 102 includes time zone indexer 108 and storage 110. Computing device 104 includes a location data source 112, a time zone determiner 114, and storage 116. Though components of second computing device 126 are not shown in FIG. 1, second computing device 126 may be configured similarly to first computing device 104 in FIG. 1, and may operate as described herein for first computing device 104. Any number of additional computing devices may be present in system 100, and may be configured and operate similarly to first computing device 104. System 100 is further described as follows.

Computer 102, computing device 104, and computing device 126 may each be any type of stationary or mobile computing device, including a mobile computer or mobile computing device (e.g., a Microsoft® Surface® device, a personal digital assistant (PDA), a laptop computer, a notebook computer, a tablet computer such as an Apple iPad™, a netbook, etc.), a mobile phone (e.g., a cell phone, a smart phone such as a Microsoft Windows® phone, an Apple iPhone, a phone implementing the Google® Android™ operating system, a Palm® device, a Blackberry® device, etc.), a wearable computing device (e.g., a smart watch, a head-mounted device including smart glasses such as Google® Glass™, etc.), or other type of mobile device (e.g., an automobile), or a stationary computing device such as a desktop computer or PC (personal computer). Still further, computing devices 104 and 126 may each be a portable media player, a stationary or handheld gaming console, a personal navigation assistant, a camera, or other type of stationary or mobile device containing an electronic clock.

Each of computer 102, computing device 104, and computing device 126 may include at least one network interface that enables communications over network 106. Such a network interface may be one or more of any type of network interface (e.g., network interface card (NIC)), wired or wireless, such as an as IEEE 802.11 wireless LAN (WLAN) wireless interface, a Worldwide Interoperability for Microwave Access (Wi-MAX) interface, an Ethernet interface, a Universal Serial Bus (USB) interface, a cellular network interface, a Bluetooth™ interface, a near field communication (NFC) interface, etc. Further examples of network interfaces are described elsewhere herein. Examples of network 106 include a local area network (LAN), a wide area network (WAN), a personal area network (PAN), and/or a combination of communication networks, such as the Internet.

Figure 2:
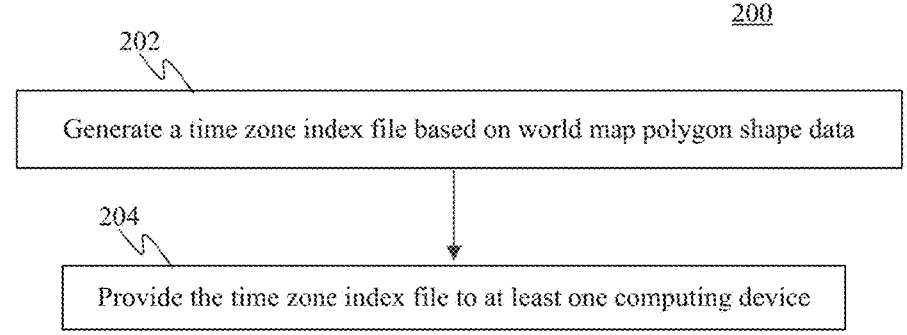
FIG. 2 shows a flowchart providing a process for generating a time zone index file, according to an example embodiment.

Time zone indexer 108 is configured to generate a time zone index file on computer 102. For instance, in an embodiment, computer 102 may operate according to FIG. 2. FIG. 2 shows a flowchart 200 providing a process for generating a time zone index file, according to an example embodiment. Flowchart 200 is described as follows with respect to FIG. 1.

Flowchart 200 of FIG. 2 begins with step 202. In step 202, a time zone index file is generated based on world map polygon shape data. In an embodiment, time zone indexer 108 is configured to generate a time zone index file 120. Time zone indexer 108 receives map data 118 from storage 110. Map data 118 indicates a map of the world in the form of polygons (each defined by shape data in the form of coordinates, vectors, etc.), and indicates a time zone for each polygon. Each time zone may be formed by one or more polygons. Time zone indexer 108 is configured to convert map data 118 into a time zone index by segmenting the world map into cells, generating a cell identifier for each cell, and associating each cell identifier with a time zone. The cell identifiers are generated in a manner that enables compact storage of the association of cell identifiers and time zones. For example, in an embodiment (as described elsewhere herein), the cell identifiers may be generated through the use of a space-filling curve (e.g., a Hilbert curve), which generates the cell identifiers efficiently and compactly. The association of cell identifiers and time zones is encoded in time zone index file 120. As shown in FIG. 1, time zone index file 120 is stored in storage 110.

In step 204, the time zone index file is provided to at least one computing device. In an embodiment, time zone index file 120 may be provided to computing device 104, computing device 126, and/or any further number of computing devices by any suitable mechanism. For instance, as shown in FIG. 1, time zone index file 120 may be transmitted to computing devices 104 and 126 over network 106 (in a communication signal), or may be provided to computing devices in another manner. Time zone index file 120 is shown stored in storage 116 in computing device 104. Time zone index file 120 may be used at computing device 104 to determine a local time zone for computing device 104.

Figure 3:
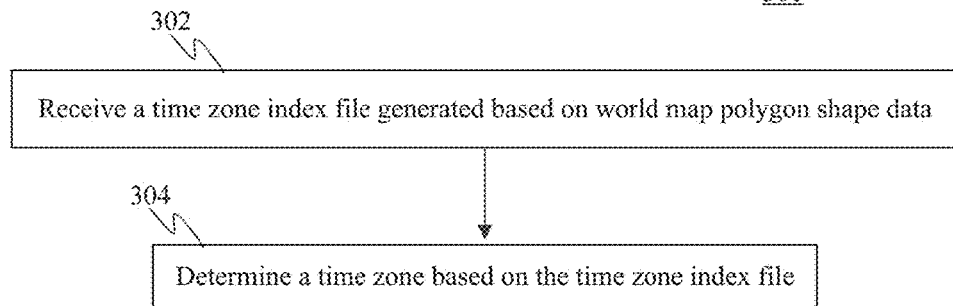
FIG. 3 shows a flowchart providing a process for using a time zone index file to determine a local time zone, according to an example embodiment.

In particular, time zone determiner 114 of computing device 104 is configured to determine a local time zone (a time zone in which computing device 104 is positioned), so that a clock of computing device 104 may provide correct local time. In an embodiment, computing device 104 may operate according to FIG. 3. FIG. 3 shows a flowchart 300 providing a process for using a time zone index file to determine a local time zone, according to an example embodiment. Flowchart 300 is described as follows with respect to FIG. 1.

Flowchart 300 of FIG. 3 begins with step 302. In step 302, a time zone index file generated based on world map polygon shape data is received. As shown in FIG. 1, computing device 104 receives time zone index file 120 from computer 102 via network 106, which is stored in storage 116. As described above with respect to FIG. 2, time zone index file 120 was generated based on world map polygon shape data.

In step 304, a time zone is determined based on the time zone index file. For instance, as shown in FIG. 1, location data source 112 may provide a location for computing device 104. Location data source 112 may provide the location in any of one or more techniques, including using GPS (global positioning system) techniques (e.g., using one or more GPS receivers), local positioning systems (e.g., using cellular base stations, Wi-Fi access points, radio towers, etc.), based on IP address, based on Mobile Country Code (MCC) retrievable from a cell phone stack, Network Identity and Time Zone (NITZ) packets, and/or using other positioning techniques, as would be known to persons skilled in the relevant art(s). Location data source 112 generates location information 122, which indicates the provided location. In one embodiment, location data source 112 outputs location information 122 based on a single location technique (e.g., GPS). For example, location data source 112 may output location information 122 to include the only location available, or a location selected from several available sources/techniques as the most reliable available location (e.g., according to a ranking of sources/techniques in an order of precedence) (e.g., GPS weighted higher as being more reliable, IP address weighted lower as being less reliable). In another embodiment, location data source 112 outputs location information 122 based on a combination of location techniques (e.g., GPS, IP address, etc.). For instance, location data source 112 may optionally weight the contribution of each location technique to generate a location as a combination.

Time zone determiner 114 receives location information 122 from location data source 112 and time zone index file 120 from storage 116. Time zone determiner 114 is configured to determine the time zone in which computing device 104 is located by generating an index value based on the location of computing device 104 (indicated by location information 122), and applying the index value to time zone index file 120. Time zone index file 120 maps the applied index value to the time zone in which computing device 104 is located. As shown in FIG. 1, time zone determiner 114 may output the determined time zone as time zone 124. Time zone 124 may indicate the determined time zone in any manner, including as an alphanumerical code (e.g., "America/Los_Angeles"), human readable text (e.g., "Pacific Time Zone"), or other form. Time zone 124 may be applied to a clock mechanism of computing device 104 to be used as the time zone setting of the clock mechanism.

In embodiments, location data source 112 may be configured to monitor position changes for computing device 104, and time zone determiner 114 may trigger an update to time zone 124 based on various movement/position criteria, including movement by computing device 104 out of a determined region, an edge of a time zone being predicted to be reached by computing device 104, other movement/position criteria, or other criteria. For instance, further types of triggers may be used (in addition to, or alternatively to movement), including device power-on or wake up, turning on the time zone determination feature, screen-on/wakeup, and exiting airplane mode. By updating time zone 124 at particular events, rather than continually reading location and recalculating time zone 124, processor bandwidth and power/battery life may be conserved in computing device 104.

Note that storage 110 and 116 may each include one or more of any type of physical storage hardware/circuitry to store data, including a magnetic disc (e.g., in a hard disk drive), an optical disc (e.g., in an optical disk drive), a magnetic tape (e.g., in a tape drive), a memory device such as a RAM device, a ROM device, etc., and/or any other suitable type of physical storage hardware/circuitry.

Accordingly, in embodiments, a time zone index file may be generated, and the file may be used by devices to determine a local time zone. Such embodiments may be performed in various ways, examples of which are described in the following subsections. The immediately following subsection describes example embodiments for generating a time zone index file, followed by a subsection describing example embodiments for using a time zone index file in a user device to determine a local time zone. A subsequent subsection describes example embodiments for determining instances to update the time zone setting in a user device.

A. Example Embodiments for Time Zone Index Generation

Figure 4:
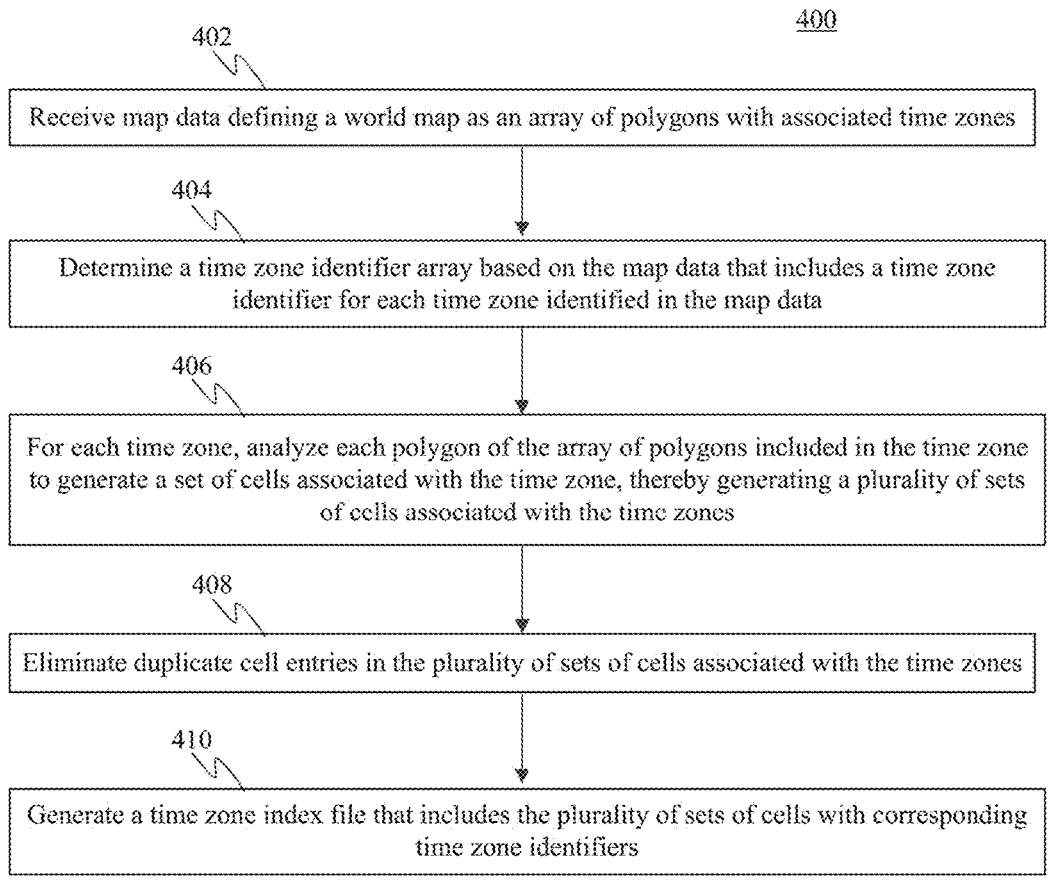
FIG. 4 shows a flowchart providing a process for generating a time zone index file, according to an example embodiment.
Figure 5:
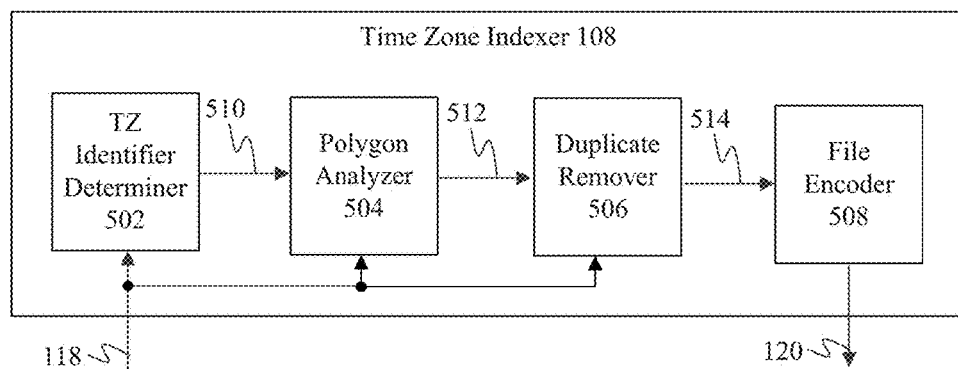
FIG. 5 shows a block diagram of a time zone indexer configured to generate a time zone index file, according to an example embodiment.

As described above, time zone indexer 108 is configured to generate a time zone index file, such as time zone index file 120. The time zone index file may be used by user devices to determine a local time zone. Time zone indexer 108 may operate in various ways, and may be configured in various ways, to perform this function. For instance, in an embodiment, time zone indexer 108 may operate according to FIG. 4. FIG. 4 shows a flowchart 400 providing a process for generating a time zone index file, according to an example embodiment. Furthermore, FIG. 5 shows a block diagram of time zone indexer 108, according to an example embodiment. In an embodiment, time zone indexer 108 of FIG. 5 may operate according to flowchart 400. As shown in FIG. 5, time zone indexer 108 includes a time zone (TZ) identifier determiner 502, a polygon analyzer 504, a duplicate remover 506, and a file encoder 508. Flowchart 400 is described as follows with respect to time zone indexer 108 of FIG. 5.

Flowchart 400 begins with step 402. In step 402, map data is received defining a world map as an array of polygons with associated time zones. As shown in FIG. 5, TZ identifier determiner 502 receives map data 118. Map data 118 indicates a map of the world in the form of polygons, with each polygon defined by shape data in the form of one or more of points, coordinates, vectors, etc. Furthermore, map data 118 indicates a time zone for each polygon of the world map. Each time zone includes one or more of the polygons.

Figure 6:
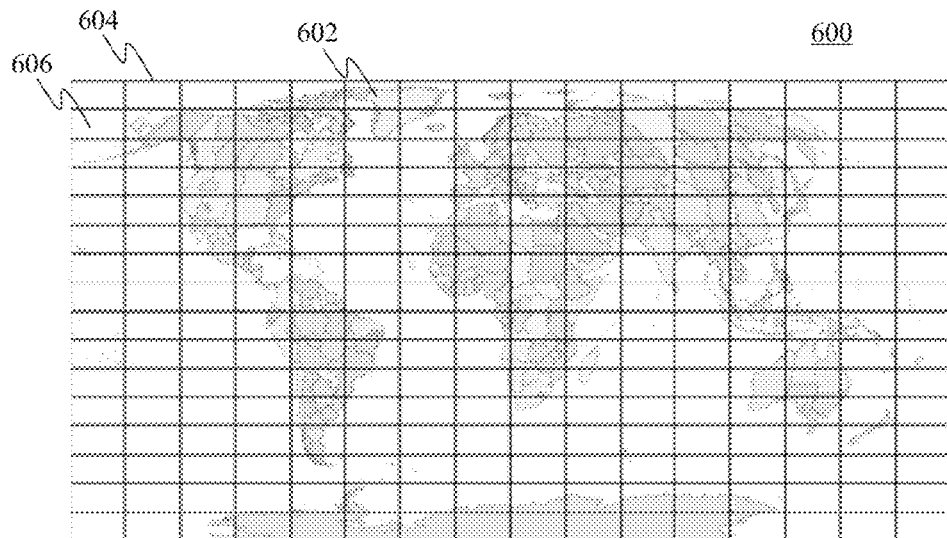
FIG. 6 shows a grid imposed on a world map.

For instance, FIG. 6 shows a world map 600, which may be defined by map data 118. Regions of the world are shown in world map 600 in the form of polygons 602, which define the boundaries of the time zones. A grid 604 is imposed on world map 600. Grid 604 is defined by an array of cells 606. Note that in the example of FIG. 6, cells 606 are rectangular. The rectangular shape accounts for there being twice the number of longitudinal lines (−180° to +180°) relative to latitudinal lines (−90° to +90°). In other embodiments, other shapes for cells 606 may be used, including square, trapezoidal, etc. In still another embodiment, a pair of grids may be overlaid on world map 604, which provides improved horizontal accuracy at the expense of a larger output index file size.

In embodiments, grid 604 has a same number of cells (k) in each dimension, where $k=2^n$ and n is an index level, which also corresponds to the order of the space-filling curve (e.g., Hilbert curve) described in further detail below. In FIG. 6, k=16 and n=4.

A higher value for index level n means more grid cells 606, which equates to a larger time zone index file being generated. It also means each cell 606 is smaller in size, which leads to better accuracy near a border between time zones. Therefore, there is a trade-off between accuracy (or resolution) of grid 604, and the size of the resulting time zone index file.

Due to the projection of the spherical surface of the Earth to the flattened rectangle of grid 604, cells 606 nearest the poles have greater accuracy than cells 606 near the equator. A resolution may be determined using Equation 1 below:

$$R = Ce/2^n \qquad \text{Equation 1}$$

Where:
R=a lowest resolution of grid 604,
n=the index level,
Ce=the circumference of the Earth at the equator (approximately 40,075.017 km).

In the example of FIG. 6, index level n=4 and R=2504.69 km. Because many time zones could exist within a cell 606 that large, an index level of 4 represents real time zone data coarsely. For illustrative purposes, common resolutions at several example index levels higher than n=4 that are practical for time zone data are shown in Table 1 below, with corresponding example ranges of sizes of the resulting index files that may be generated:

TABLE 1

| Index Level | Resolution at Equator | Approximation of Index File Size |
|---|---|---|
| 12 | 9.78 km | 300 KB-600 KB |
| 13 | 4.89 km | 600 KB-1 MB |
| 14 | 2.45 km | 1 MB-2.5 MB |
| 15 | 1.22 km | 2.5 MB-5 MB |
| 16 | 0.61 km | 5 MB-10 MB |

Many different types of time zone identifiers may be used. For purposes of illustration, several example types of time zone identifiers are shown below, each followed by examples of their time zone identifiers:

IANA (Internet Assigned Numbers Authority): "America/New_York", "Europe/London", "Pacific/Auckland", "America/Argentina/Rio_Gallegos" (typically, Area/Locality);

IATA (International Air Transport Association): "US01", "RU03", "AU2A", "CN" (alphanumeric, always starting with country code);

Microsoft® Windows® "Pacific Standard Time", "SA Western Standard Time", "Russia Time Zone 11"; and POSIX (Portable Operating System Interface): "PST8PDT", "CET-ICEST,M3.5.0/2,M10.5.0/3", "GRNLNDST3GRN LNDDT,M10.3.0/00:00:00,M2.4.0/00:00:00".

Map data 118 may have any suitable format, including an ESRI (Environmental Systems Research Institute) shapefile, which uses a WGS (World Geodetic System) 84 projection system. WGS 84 is also frequently used by GPS location determination. Map data 118 contains definitions of polygons that represent the boundaries of each time zone. In an ESRI shapefile embodiment, each polygon is associated with a time zone identifier, stored in a data field in an attributes table (containing at least the shape data) for each polygon. For instance, IANA time zone identifiers may be used, such as "America/Los_Angeles" (which represents US Pacific Time), which cover the entire world, and are granular enough to account for variations in daylight saving time and in the history of timekeeping in each world region.

Referring back to FIG. 4, in step 404, a time zone identifier array is determined based on the map data that includes a time zone identifier for each time zone identified in the map data. In an embodiment, TZ identifier determiner 502 is configured to generate a TZ identifier array 510 based on map data 118, which that includes a time zone identifier for each time zone identified in map data 118. For instance, TZ identifier determiner 502 may scan the attributes table (or other format of shape data) for each polygon defined in map data 118 to determine all of the time zone identifiers that are present. For example, the time zone identifiers may have the form of an alphanumeric code identifier, or other form. TZ identifier array 510 is generated to include the list of all found time zone identifiers (each identifier included once).

Note that multiple types of TZ identifiers exist, which may have different bit lengths. For example, a first time zone data type, such as IANA, may use time zone identifiers having a bit length greater than time zone identifiers of a second time zone data type, such as used by Microsoft® Windows®. A mapping of the time zone identifiers from the first time zone data type to the second time zone data type may be performed to result in TZ identifiers of shorter bit lengths, enabling a smaller time zone index file to be generated. For example, CLDR (common locale data repository) (available at http://cldr.unicode.org/) may maintain a mapping from the IANA time zone identifiers to Microsoft® Windows® time zone identifiers. Other types of TZ identifiers may exist that may be used, that may be mapped to or from, in embodiments.

Referring back to FIG. 4, in step 406, for each time zone, each polygon of the array of polygons included in the time zone is analyzed to generate a set of cells associated with the time zone, thereby generating a plurality of sets of cells associated with the time zones. As shown in FIG. 5, polygon analyzer 504 receives TZ identifier array 510 and map data 118. For each time zone, polygon analyzer 504 is configured to analyze the polygons of the time zone to generate a set of world map grid cells associated with the time zone. As shown in FIG. 5, polygon analyzer 504 outputs cell identifiers 512, which includes cell identifiers identified to be associated with each time zone.

Polygon analyzer 504 may identify the time zones by their TZ identifiers in TZ identifier array 510. For each identified time zone, polygon analyzer 504 may parse the polygons of map data 118 to determine the cells associated with the time zone. In cell identifiers 512, polygon analyzer 504 lists the cell identifiers of the cells in association with the corresponding TZ identifiers.

Figure 7:
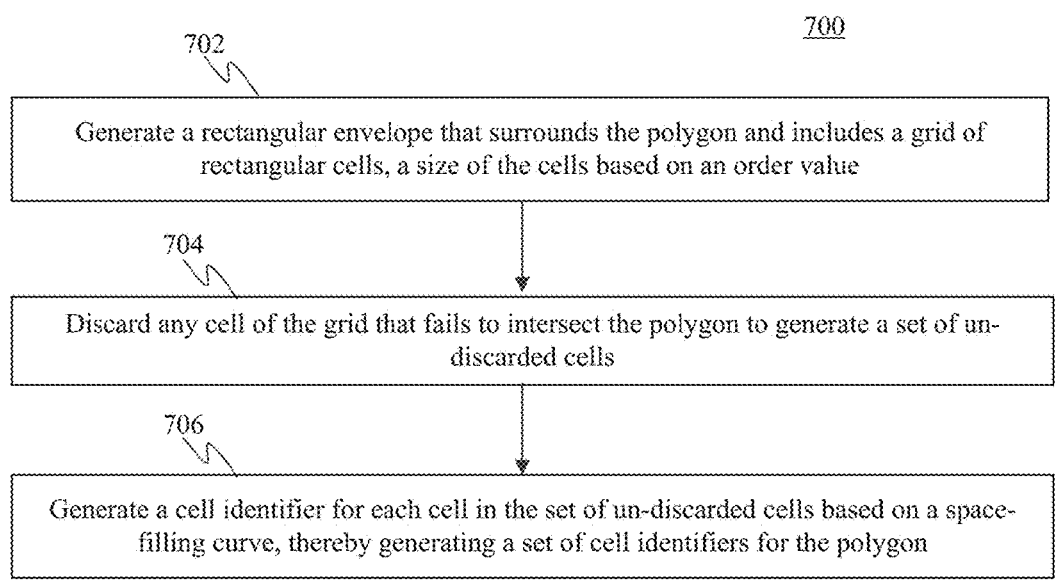
FIG. 7 shows a flowchart providing a process for generating a set of cell identifiers for a polygon according to a space-filling curve, according to an example embodiment.
Figure 8:
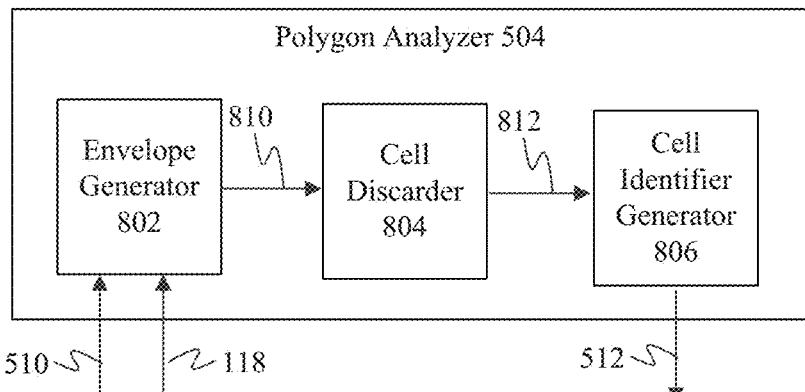
FIG. 8 shows a block diagram of a polygon analyzer configured to generate a set of cell identifiers for a polygon according to a space-filling curve, according to an example embodiment.

Polygon analyzer 504 may operate in various ways, and may be configured in various ways, to identify the cells. For instance, in an embodiment, polygon analyzer 504 may operate according to FIG. 7. FIG. 7 shows a flowchart 700 providing a process for generating a set of cell identifiers for a polygon according to a space-filling curve, according to an example embodiment. Furthermore, FIG. 8 shows a block diagram of a polygon analyzer 504 configured to generate a set of cell identifiers for a polygon according to a space-filling curve, according to an example embodiment. As shown in FIG. 8, polygon analyzer 504 includes an envelope generator 802, a cell discarder 804, and a cell identifier generator 806. In an embodiment, polygon analyzer 504 of FIG. 8 may operate according to flowchart 700. Flowchart 700 is described as follows with respect to polygon analyzer 504 of FIG. 8.

Flowchart 700 is performed for each polygon (e.g., identified by polygon identifier in polygon attribute data) in map data 118, for each time zone (e.g., identified by time zone identifier).

Flowchart 700 begins with step 702. In step 702, a rectangular envelope is generated that surrounds the polygon and includes a grid of rectangular cells, a size of the cells based on an order value. As shown in FIG. 8, envelope generator 802 receives TZ identifier array 510 and map data 118. Envelope generator 802 is configured to define a rectangular envelope surrounding the polygon, and then a grid of smaller rectangles within the rectangular envelope. The rectangular envelope is sized to be aligned with the grid of the world map defined in map data 118 (e.g., grid 604 in FIG. 6). The size of the smaller rectangles is based on the order (e.g., the index level n described above) of a space-filling curve (described further below), such as a Hilbert curve.

Figure 9:
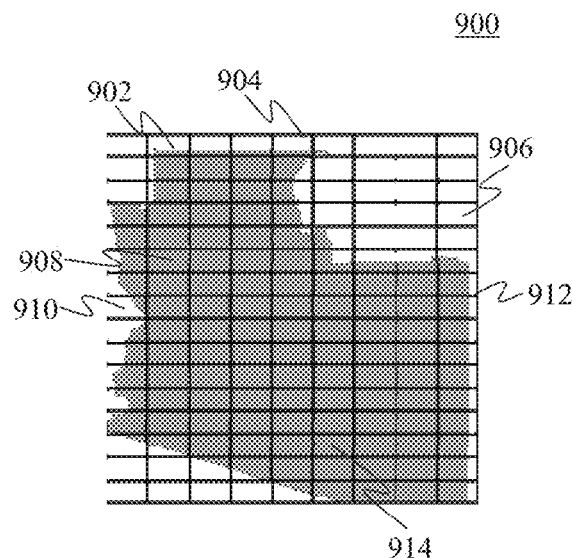
FIG. 9 shows a grid of cells imposed over a polygon associated with a particular time zone.

For example, FIG. 9 shows a map portion 900, which includes a grid 904 of cells imposed over a polygon 902 associated with a particular time zone. Polygon 902 covers most of the state of Arizona in the United States (a northeast corner missing from Arizona in polygon 902 belongs to the Navajo Nation, which has different time zone rules, and thus is in a different polygon). A rectangular outer edge of grid 904 is rectangular envelope 912, generated by envelope generator 802. In an embodiment, rectangular envelope 912 aligns with the existing map grid of map data 118 (e.g., grid 604 in FIG. 6), meaning that the edges of rectangular envelope 912 align with corresponding edges of the map grid. In this example of FIG. 9, the size of the cells of grid 904, such as cells 906, 908, and 910, matches the smallest cell size of the grid, as defined by the index level n.

As shown in FIG. 8, envelope generator 802 generates rectangular envelope 810, which indicates the dimensions and location of the rectangular envelope generated for the polygon, as well as the time zone identifier for the polygon.

Referring back to FIG. 7, in step 704, any cell of the grid that fails to intersect the polygon is discarded to generate a set of un-discarded cells. As shown in FIG. 8, cell discarder 804 receives rectangular envelope 810. Cell discarder 804 is configured to the cells of rectangular envelope 810 to determine any cells intersecting the polygon. As such, each cell included in rectangular envelope 810 is tested against the polygon. Only the cells in rectangular envelope 810 that intersect the polygon are maintained, while the others are discarded. Cell discarder 804 generates un-discarded cells indication 812, which identifies the cells of rectangular envelope 810 that are un-discarded.

For example, with reference to polygon 902 of FIG. 9, cell discarder 804 analyzes all of the cells included in the sixteen by nine array of cells (one hundred forty-four cells) inside rectangular envelope 810. Cells that intersect with polygon 902, including any cells entirely included within, or overlapping an edge of polygon 902, are maintained. Cells that do not intersect with polygon 902, meaning cells that are completely outside polygon 902, are discarded. To perform this analysis on each cell, cell discarder 804 determines a geometry and location of polygon 902 (e.g., from polygon attributes in maps data 118), determines a geometry and location of the cell, and determines whether any part of polygon 902 intersects the cell. With respect to three example cells shown in FIG. 9, cell 906 is discarded (as completely outside polygon 902), while cell 908 (included within) and cell 910 (overlapping) are maintained. Cells 908 and 910 are thus are identified in un-discarded cells indication 812 as un-discarded, along with the other cells intersecting polygon 902.

In step 706, a cell identifier is generated for each cell in the set of un-discarded cells based on a space-filling curve, thereby generating a set of cell identifiers for the polygon. As shown in FIG. 8, cell identifier generator 806 receives un-discarded cells indication 812. Cell identifier generator 806 is configured to generate a cell identifier for each cell indicated in un-discarded cells indication 812. Cell identifier generator 806 generates the cell identifiers to be unique with respect to other cells of the polygon, as well as being unique to cells of any other polygons of the same time zone, and to cells of all other time zones.

Cell identifier generator 806 may generate the cell identifiers in any manner. For example, cell identifier generator 806 may generate the cell identifiers according to a continuous, space-filling curve, which aids in enabling cell identifiers to be concise, their numbering to be continuous, and able to be grouped in ranges (as further detailed below). Examples of applicable space-filling curves include the Peano curve, the Moore curve, and the Hilbert curve, which are known to persons skilled in the relevant art(s). Cell identifier generator 806 may be configured in various ways to generate a space-filling curve. For illustrative purposes, cell identifier generator 806 is described as follows with respect to a Hilbert curve, though cell identifier generator 806 may be configured for other space-filling curve types, as will be apparent to persons skilled in the relevant art(s) from the teachings herein.

Figure 10:
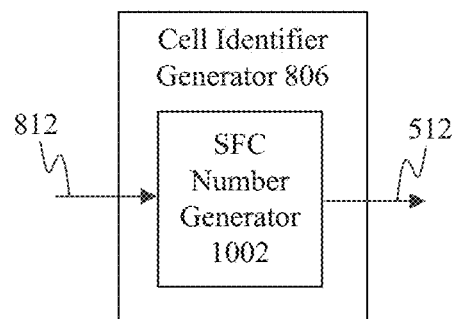
FIG. 10 shows a block diagram of a cell identifier generator that includes a Hilbert number generator, according to an example embodiment.

For instance, FIG. 10 shows a block diagram of cell identifier generator 806, according to an example embodiment. As shown in FIG. 10, cell identifier generator 806 includes a SFC (space filling curve) number generator 1002. SFC number generator 1002 is configured to generate a Hilbert number, or similar number generated according to another space filling curve algorithm, as a cell identifier for each cell indicated in un-discarded cells indication 812. Hilbert numbers are generated by following principles of the Hilbert curve.

Figure 11:
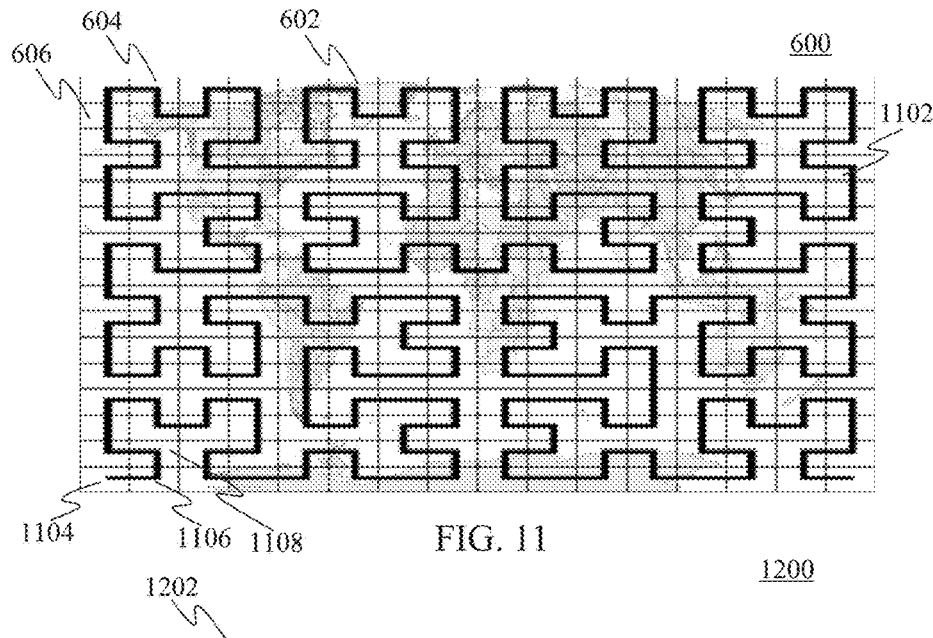
FIG. 11 shows the grid imposed on the world map of FIG. 6, with a Hilbert curve imposed thereon, according to an example embodiment.

As an illustration, FIG. 11 shows grid 604 imposed on world map 600 of FIG. 6, with a Hilbert curve 1102 imposed thereon, according to an example embodiment. Each cell of grid 604 can be assigned a Hilbert number, following the path of Hilbert curve 1102. For instance, cell 1104 in the lower left corner may be assigned number 1, the next cell on the path (to the right of cell 1104), cell 1006, may be assigned number 2, the next cell on the path (above cell 1106), cell 1108, may be assigned number 3, and so forth. All cells in grid 604 may be assigned a Hilbert number in this manner. With respect to FIG. 9, each cell listed in un-discarded cells indication 812 may be assigned a Hilbert number as a cell identifier in this manner. Accordingly, any two sequential Hilbert numbers are also adjacent to each other in a grid. This is a special property of the Hilbert curve (and some other space-filing curves), which helps to minimize the size of generated time zone index files.

SFC number generator 1002 may be configured/operate in various ways to generate a Hilbert number as a cell identifier for each cell listed in un-discarded cells indication 812. For example, when SFC number generator 1002 is implemented to use the Hilbert curve, SFC number generator 1002 may perform the algorithm below to generate a cell identifier for a cell as a Hilbert number (shown as C code, for illustration):

```
//convert (x,y) to d
int xy2d (int n, int x, int y) {
    int rx, ry, s, d=0;
    for (s=n/2; s>0; s/=2) {
        rx = (x & s) > 0;
        ry = (y & s) > 0;
        d += s * s * ((3 * rx) ^ ry);
        rot(s, &x, &y, rx, ry);
    }
    return d;
}
```

Where:

x, y=the input x, y coordinates location of the cell in the grid;

n=the index level=order value; and rot=a rotation function which may be implemented as follows, for example:

```
//rotate/flip a quadrant appropriately
void rot(int n, int *x, int *y, int rx, int ry) {
    if (ry == 0) {
        if (rx == 1) {
            *x = n-1 - *x;
            *y = n-1 - *y;
        }
```

```
        //Swap x and y
        int t = *x;
        *x = *y;
        *y =t;
    }
}
```

For example, with respect to FIG. 9, cell 914 has x,y coordinates of (5, 2) (assuming, for ease of illustration, that the bottom left cell in FIG. 9 has coordinates of (0, 0)). For an order value of 3, SFC number generator 1002 may perform the above algorithm to determine a cell identifier for cell 914 to be 55. SFC number generator 1002 may generate a cell identifier for each cell in un-discarded cells indication 812 in this manner. In other embodiments, SFC number generator 1002 may use other algorithms to generate a cell identifier as a Hilbert number. The cell identifiers are output by SFC number generator 1002 as cell identifiers 512.

Accordingly, a single iteration of flowchart 700 generates a set of cell identifiers for a particular polygon. Flowchart 700 is repeated for all polygons covering the same time zone. The cell identifiers identified for all polygons of the time zone may be listed/conveyed in any form, such as a set of ranges (e.g., as a half-open interval [start, end)).

For example, if all of the non-discarded cells of a time zone are numbered {30, 31, 32, 40, 41, 56, 57, 58, 59, 60}, this list of cell identifiers may be converted to the set of ranges {[30, 33), [40, 42), [56, 61)}. By expressing the cell identifiers in terms of ranges, the cell identifiers may be expressed more concisely. This range-set is associated with the time zone identifier (determined in step 404 of FIG. 4) in cell identifiers 512 output by cell identifier generator 806.

Referring back to flowchart 400 (FIG. 4), in step 408, duplicate cell entries in the plurality of sets of cells associated with the time zones are eliminated. As shown in FIG. 5, duplicate remover 506 receives cell identifiers 512. Duplicate remover 506 is configured to received and combine cell identifiers 512 for all time zones, and to remove duplicate cell entries, as well as performing one or more housekeeping functions (e.g., sorting) on the data. As shown in FIG. 5, duplicate remover 506 outputs de-duplicated cell identifiers 514, which includes all cell identifiers, each associated with a single time zone.

Figure 12:
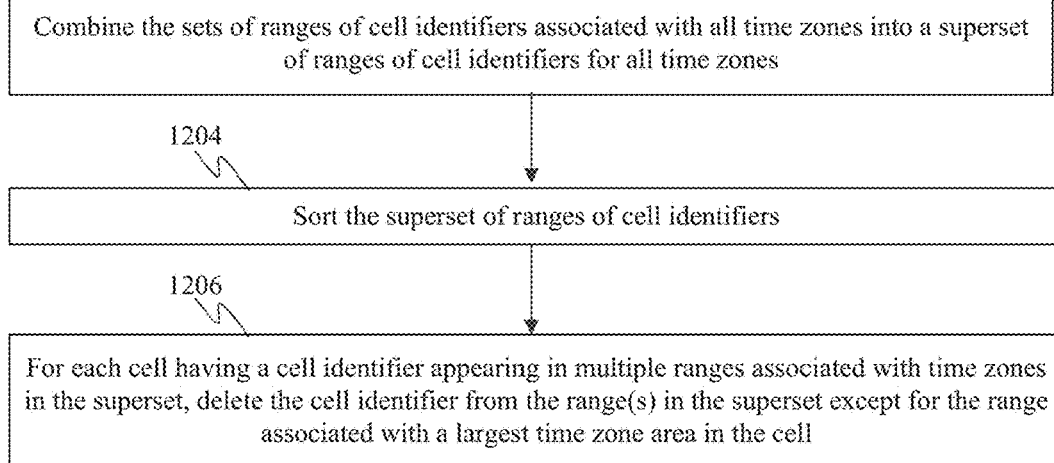
FIG. 12 shows a flowchart providing a process for sorting cell identifier ranges and removing duplicates, according to an example embodiment.
Figure 13:
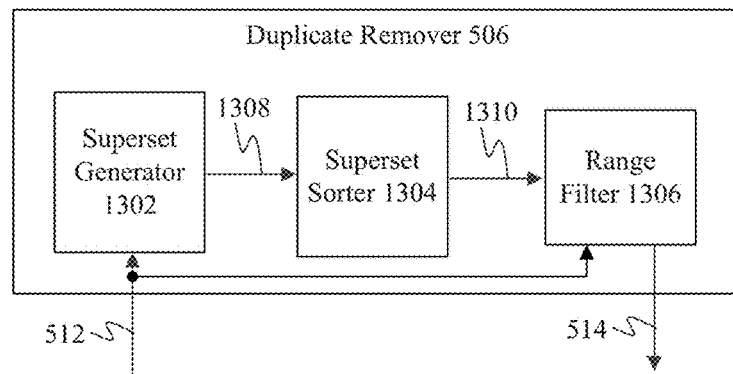
FIG. 13 shows a block diagram of a duplicate remover, according to an example embodiment.

Duplicate remover 506 may operate in various ways, and may be configured in various ways. For instance, in an embodiment, duplicate remover 506 may operate according to FIG. 12. FIG. 12 shows a flowchart 1200 providing a process for sorting cell identifier ranges and removing duplicates, according to an example embodiment. Furthermore, FIG. 13 shows a block diagram of duplicate remover 506, according to an example embodiment. As shown in FIG. 13, duplicate remover 506 includes a superset generator 1302, a superset sorter 1304, and a range filter 1306. In an embodiment, duplicate remover 506 of FIG. 13 may operate according to flowchart 1200. Flowchart 1200 is described as follows with respect to duplicate remover 506 of FIG. 13.

Flowchart 1200 begins with step 1202. In step 1202, the sets of ranges of cell identifiers associated with all time zones are combined into a superset of ranges of cell identifiers for all time zones. As shown in FIG. 13, superset generator 1302 receives cell identifiers 512. Superset generator 1302 receives and stores cell identifiers 512 received for all time zones, and combines the cell identifiers to generate a superset 1308. For instance, when ranges are used, superset 1308 includes all of the ranges of cell identifiers, and their time zone associations, in a large set or ranges.

For example, superset 1308 may be generated to include the following partial list of ranges of cell identifiers, shown for illustrative purposes: {[30, 33):1, [40, 42):1, [56, 61):1, [33, 40):2, ... }. In this example, cell identifiers 30, 31, and 32 are associated with time zone 1, cell identifiers 40 and 41 are associated with time zone 1, cell identifiers 56, 57, 58, 59, and 60 are associated with time zone 1, and cell identifiers 33, 34, 35, 36, 37, 38, and 39 are associated with time zone 2.

In step 1204, the superset of ranges of cell identifiers is sorted. As shown in FIG. 13, superset sorter 1304 receives superset 1308. Superset sorter 1304 is configured to perform a sorting function on superset 1308 to generate sorted superset 1310. For example, in an embodiment, superset sorter 1304 may reorder the ranges of cell identifiers (with time zone associations) into numerical order by cell identifier, from lowest to highest cell identifier or highest to lowest cell identifier: In other embodiments, superset sorter 1304 may sort superset 1308 in other ways.

For instance, continuing the above example ranges of cell identifiers in superset 1308, superset sorter 1304 may generate the following sorted superset 1310: {[30, 33):1, [33, 40):2, [40, 42):1, [56, 61):1, ... }. In this example, sorted superset 1310 is sorted into numerical order from lowest to highest cell identifier ("[33, 40):2" was moved between "{[30, 33):1" and "[40, 42):1").

In step 1206, for each cell having a cell identifier appearing in multiple ranges associated with time zones in the superset, the cell identifier is deleted from the range(s) in the superset except for the range associated with a largest time zone area in the cell. As shown in FIG. 13, range filter 1306 receives sorted superset 1304. Range filter 1306 is configured to parse the ranges listed in sorted superset 1304 to find any cell identifiers that occur in more than one range. For any cell identifiers occurring in more than one range (associated with different time zones), range filter 1306 is configured to remove the cell identifier from all ranges except for one, to leave the cell identifier associated only with the time zone of the range in which it is left. For example, range filter 1306 may eliminate the cell identifier from the range associated with the time zone that take less area in the cell of that cell identifier. Range filter 1306 generates de-duplicated cell identifiers 514, which includes all cell identifiers, each associated with a single time zone.

For example, in an embodiment, for each grid cell having a cell identifier appearing in multiple ranges in the superset, range filter 1306 may be configured to: determine a first area in the cell for a first time zone associated with a first range of the superset that includes the cell identifier; determine a second area in the cell for a second time zone associated with a second range of the superset, determine which is smaller of the first area of the first time zone or the second area of the second time zone, and delete the cell identifier from the first or second range in the superset associated with the first or second time zone determined to have the smaller area.

With respect to FIG. 9, cells in grid 904 that overlap multiple time zones will appear in multiple ranges in sorted superset 1304. Cell 910, for instance, overlaps multiple time zones, including time zone "1" of Arizona, and time zone "2" of California (the white space to the left of Arizona in FIG. 9). Most borders between time zones will lead to cells split among multiple time zones. As such, cell 910 will appear in multiple ranges in sorted superset 1304: a first range for time zone "1" and a second range for time zone "2". Accordingly, range filter 1306 parses the ranges of sorted superset 1304 to find the cell identifier N for cell 910 in the first and second ranges. Upon finding cell identifier N in the first and second ranges, range filter 1306 is configured to analyze cell 910 to select from which range to delete cell identifier N. Using polygon attribute information (e.g., in map data 118) and the coordinates of cell 910, range filter 1306 determines which of time zone 1 or time zone 2 takes up more space in cell 910. In this example, time zone 2 is larger in cell 910 than time zone 1. As such, range filter 1306 is configured to remove the cell identifier for cell 910 from the first range, which is associated with time zone 1. In this manner, cell 910 is associated with time zone 2.

Note that range filter 1306 may be configured to refine the resulting superset of ranges included in de-duplicated cell identifiers 514. For instance, in an embodiment, range filter 1306 may discard an ending cell identifier of each range, and add an indication of gaps in cell identifiers in the superset.

For example, range filter 1306 may refine the above example set of ranges to {30:1, 33:2, 40:1, 42:GAP, 56:1}. Here, just a beginning cell identifier is shown for each range, implying a range ends with a cell identifier immediately prior to the first cell identifier of the next listed range (e.g., 30:1 includes cell identifiers 30, 31, and 32 for time zone 1). Furthermore, the term "GAP" is shown to indicate a gap in cell identifiers starting at the listed cell identifier, and ending with a cell identifier immediately prior to the first cell identifier of the next listed range (e.g., 42:GAP is a gap in cell identifiers from cell identifier 42 through cell identifier 55). A code may be used for "GAP," such as either 0xFF or 0xFFFF, depending on whether one or two bytes can be used to account for the quantity of time zones in the file.

Referring back to flowchart 400 (FIG. 4), in step 410, a time zone index file is generated that includes the plurality of sets of cells with corresponding time zone identifiers. As shown in FIG. 5, file encoder 508 receives de-duplicated cell identifiers 514. File encoder 508 is configured to generate time zone index file 120 as a data structure, such as a file, that may be provided to other devices. File encoder 508 may be configured to further compress the information provided in de-duplicated cell identifiers 514, and/or perform any other suitable processing on the information prior to storing in time zone index file 120. Time zone index file 120 may be stored as a binary index file, or in another format.

B. Example Embodiments for Determining Time Zone in a User Device

Figure 14:
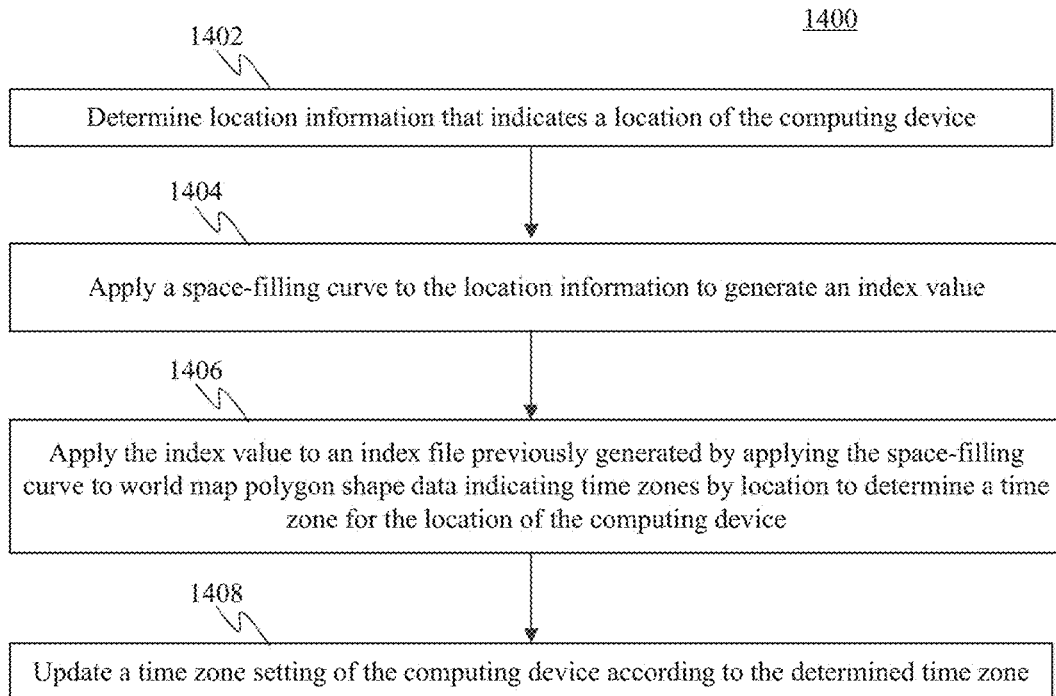
FIG. 14 shows a flowchart providing a process for using a time zone index file to update a local time zone setting, according to an example embodiment.
Figure 15:
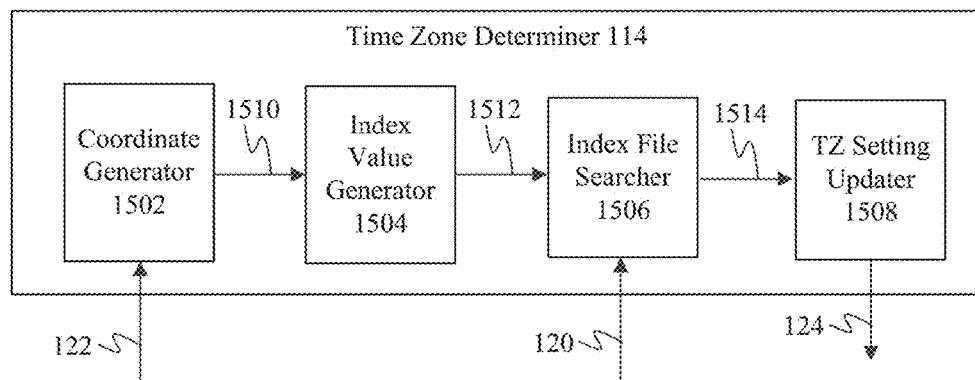
FIG. 15 shows a block diagram of a time zone determiner, according to an example embodiment.

As described above, time zone determiner 114 of FIG. 1 is configured to determine a local time zone based on location and a stored time zone index file, such as time zone index file 120. Time zone determiner 114 may operate in various ways, and may be configured in various ways, to perform this function. For instance, in an embodiment, time zone determiner 114 may operate according to FIG. 14. FIG. 14 shows a flowchart 1400 providing a process for using a time zone index file to update a local time zone setting, according to an example embodiment. Furthermore, FIG. 15 shows a block diagram of time zone determiner 114, according to an example embodiment. As shown in FIG. 15, time zone determiner 114 includes a coordinate generator 1502, an index value generator 1504, an index file searcher 1506, and a TZ setting updater 1508. In an embodiment, time zone determiner 114 of FIG. 15 may operate according to flowchart 1400. Flowchart 1400 is described as follows with respect to time zone determiner 114 of FIG. 15.

Flowchart 1400 begins with step 1402. In step 1402, location information that indicates a location of the computing device is determined. As described above, location data source 112 of FIG. 1 may provide a location for computing device 104 according to any of one or more techniques. Location data source 112 generates location information 122, which indicates the provided location in any suitable format, including as coordinates, latitude and longitude, etc.

Note that in an embodiment, subsequent processing of the location information may be performed on coordinates. In such case, if location data source 112 provides location information in the form of latitude and longitude, coordinate generator 1502 (FIG. 15) may be configured to convert the latitude and longitude values in location information 122 to coordinate values (x, y), and to include the coordinate values (x, y) in coordinate information 1510.

For instance, Equations 2 and 3 shown below may be used by coordinate generator 1502 to convert latitude and longitude values to coordinate values (x, y):

$$x = \text{FLOOR}((\text{lon}+180)/(360/2^n)) \qquad \text{Equation 2}$$

$$y = \text{FLOOR}((\text{lat}+90)/(180/2^n)) \qquad \text{Equation 3}$$

Where:
lon=the longitude value;
lat=the latitude value;
n=the index level; and
FLOOR=a truncation function to remove decimal values.

Referring back to FIG. 4, in step 1404, a space-filling curve is applied to the location information to generate an index value. As shown in FIG. 15, index value generator 1504 receives coordinate information 1510. In an embodiment, index value generator 1504 is configured to generate an index value based on a space-filling curve, in the same manner as used to generate cell identifiers 512 above (e.g., in step 706 of FIG. 7; used by cell identifier generator 806 in FIG. 8). As shown in FIG. 15, SFC number calculator 1702 outputs index value 1512.

For example, index value generator 1504 may generate the index value according to a continuous, space-filling curve described above, including the Peano curve, the Moore curve, and the Hilbert curve, which are known to persons skilled in the relevant art(s). For illustrative purposes, index value generator 1504 is described as follows with respect to a Hilbert curve.

Figure 16:
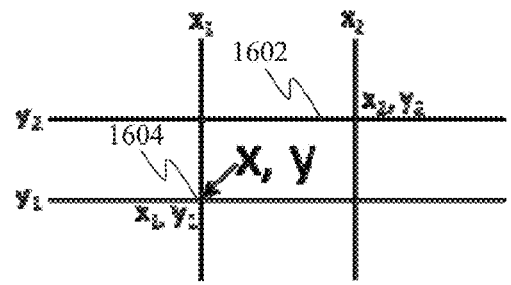
FIG. 16 shows a grid cell formed by grid lines.

In an embodiment, the (x,y) coordinates, and the corresponding Hilbert number, actually identify a point on a map at the intersection of two grid lines. FIG. 16 illustrates this, showing a cell 1602 formed between a pair of horizontal grid lines and a pair of vertical grid lines. In FIG. 16, the (x,y) coordinates, and the corresponding Hilbert number for cell 1602, identify a point associated with cell 1602. Because we want to identify the rectangular cell 1602, rather than just a point, by convention we use the lower left point of a cell, point 1604 of cell 1602, to be representative of the entire cell.

Figure 17:
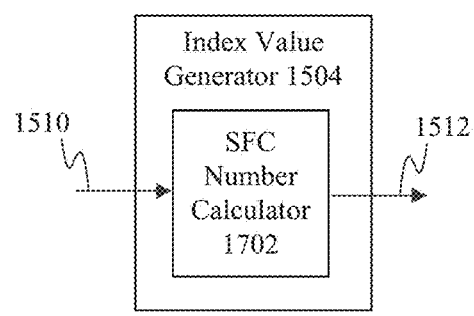
FIG. 17 shows a block diagram of an index value generator, according to an example embodiment.

FIG. 17 shows a block diagram of index value generator 1504, according to an example embodiment. As shown in FIG. 17, index value generator 1504 includes a SFC (space filling curve) number calculator 1702. Similar to SFC number generator 1002 (FIG. 10), SFC number calculator 1702 is configured to generate a Hilbert number, or similar number according to another space filing curve algorithm, based on the (x, y) coordinates received in coordinate information 1510. The Hilbert number is a cell identifier for the cell located at the received (x, y) coordinates. SFC number calculator 1702 is configured to generate Hilbert numbers following principles of the Hilbert curve, similarly to Hilbert number generate 1002. For example, in an embodiment, SFC number calculator 1702 may generate index value 1512 as a Hilbert number according to the Hilbert algorithm shown above (illustrated in C code). In other embodiments, SFC number calculator 1702 may generate index value 1512 in other ways.

Referring back to FIG. 14, in step 1406, the index value is applied to an index file previously generated by applying the space-filling curve to world map polygon shape data indicating time zones by location to determine a time zone for the location of the computing device. As shown in FIG. 15, index file searcher 1506 receives index value 1512 and time zone index file 120. In an embodiment, index file searcher 1506 is configured to scan time zone index file 120 for the range containing index value 1512. For instance, index file searcher 1506 may perform a simple binary search, looking for the first number in time zone index file 120 that is greater than index value 1512, then taking the previous entry (when using the range format described above). Index file searcher 1506 generates time zone indication 1514, which indicates the determined time zone.

For example, if time zone index file 120 contains the superset of ranges {30:1, 33:2, 40:1, 42:GAP, 56:1} and the index value 1512 is 41, the ranges are searched to find 42:GAP. The previous entry to 42:GAP (40:1) is accessed, which indicates time zone number 1. 4. TZ identifier array 510, which lists time zones by identifiers, time zone index file 120, or other location may be accessed to map the time zone identifier (e.g., number 1) to the time zone name (e.g., "America/Phoenix" (with IANA zone ids), or "US Mountain Standard Time" (when using Microsoft® Windows® zone identifiers)). In other embodiments, index file searcher 1506 may look up index value 1512 in time zone index file 120 in other ways, to generate time zone indication 1514.

In step 1408, a time zone setting of the computing device is updated according to the determined time zone. As shown in FIG. 15, TZ setting updater 1508 receives time zone indication 1514. In an embodiment, TZ setting updater 1508 interfaces with a calendar and/or clock mechanism, providing time zone 124, so that a time zone of the computing device may be updated, and correct time provided/displayed.

C. Example Embodiments for Determining Instances to Re-Determine Time Zone

As described above, time zone determiner 114 of FIG. 1 may be configured to determine instances at which a time zone may be re-determined and a time zone setting updated in a user device. By determining instances at which to re-determine the time zone, rather than re-determining time zone with every change of location, processing bandwidth and battery power may be conserved.

In an embodiment, time zone determiner 114 may be configured to trigger time zone determinations when the user device moves to an edge of a time zone. Movement of the user device to the edge of a time zone may be based on determining threshold regions around the user device having a radius equal to a distance to the closest time zone edge to the user device. When it is detected that the user device has reached the edge of the current threshold region, it is checked whether the user device also reached the time zone edge. If the time zone edge is reached, a new time zone determination is triggered. If the time zone edge is not reached, a new threshold region is determined for the user device.

Figure 18:
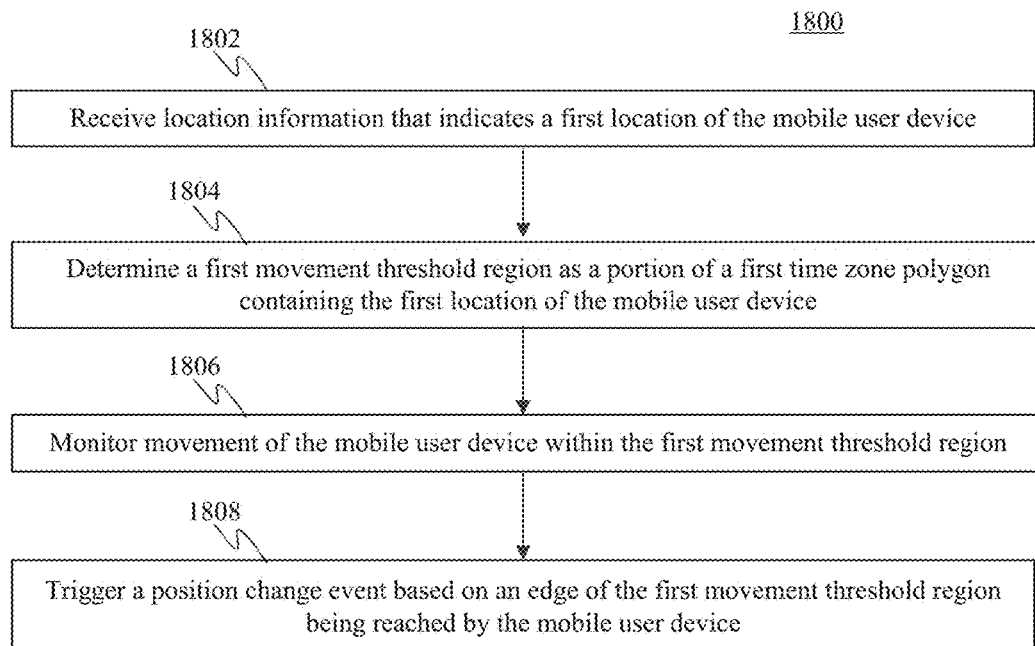
FIG. 18 shows a flowchart providing a process for monitoring movement of a mobile user device to trigger a position change event, according to an example embodiment.
Figure 19:
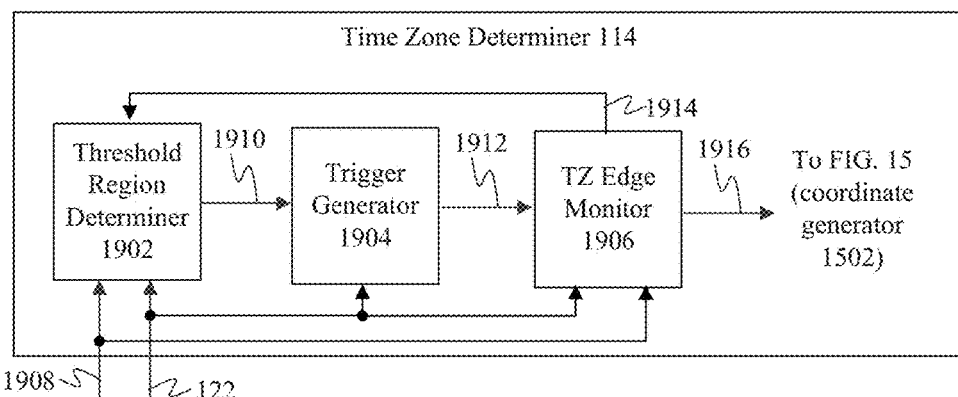
FIG. 19 shows a block diagram of a time zone determiner, according to an example embodiment.

Time zone determiner 114 may operate in various ways, and may be configured in various ways, to perform this function. For instance, in an embodiment, time zone determiner 114 may operate according to FIG. 18. FIG. 18 shows a flowchart 1800 providing a process for monitoring movement of a mobile user device to trigger a position change event, according to an example embodiment. Furthermore, FIG. 19 shows a block diagram of time zone determiner 114, according to an example embodiment. As shown in FIG. 19, time zone determiner 114 includes a threshold region determiner 1902, a trigger generator 1904, and a TZ edge monitor 1906. In an embodiment, time zone determiner 114 of FIG. 19 may operate according to flowchart 1800. Flowchart 1800 is described as follows with respect to time zone determiner 114 of FIG. 19.

Flowchart 1800 begins with step 1802. In step 1802, location information that indicates a first location of the mobile user device is received. As described above, location data source 112 of FIG. 1 may provide a location for computing device 104 according to any of one or more techniques. Location data source 112 generates location information 122, which indicates the provided location in any suitable format, including as coordinates, latitude and longitude, etc.

In step 1804, a first movement threshold region is determined that is a portion of a first time zone polygon containing the first location of the mobile user device. As shown in FIG. 19, threshold region determiner 1902 receives location information 122 and time zone polygon shape data 1908. In an embodiment, threshold region determiner 1902 determines a movement threshold region 1910 based on location information 122. Movement threshold region 1910 is a region surrounding the mobile user device (e.g., computing device 104 in FIG. 1), and when the mobile user device moves to an edge thereof, triggers re-determinations of time zone, as further detailed below.

Threshold region determiner 1902 may determine movement threshold region 1910 in various ways. For instance, in an embodiment, threshold region determiner 1902 may determine the movement threshold region 1910 to be circular, and to have a radius set to a distance to a nearest edge of a first time zone polygon containing the location of the mobile user device. In other embodiments, threshold region determiner 1902 may set movement threshold region 1910 to have other shapes, such as rectangular, elliptical, irregular, or other shape.

Figure 20:
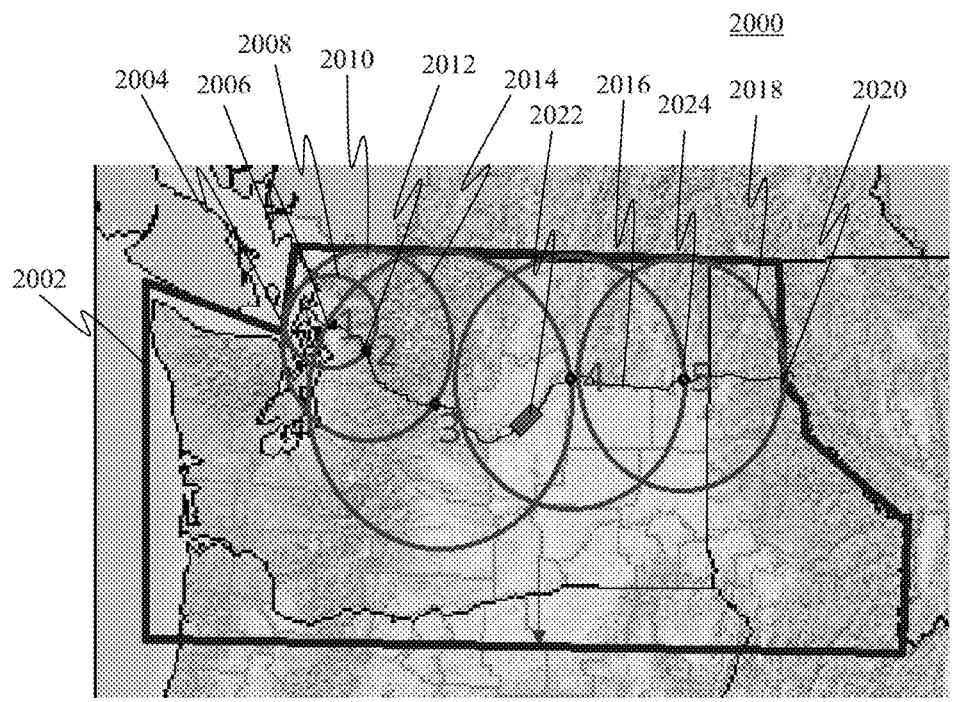
FIG. 20 shows a map illustrating movement of a mobile user device with several movement threshold regions generated at corresponding trigger points, according to example embodiments.

FIG. 20 shows a map 2000 illustrating movement of a mobile user device 2022 along a path 2016, according to example embodiments. Mobile user device 2022 may be configured according to embodiments herein (e.g., computing device 104 in FIG. 1, etc.). Mobile user device 2022 may begin at a first location 2006 (e.g., Redmond Wash.). First location 2006 may be located inside a time zone polygon 2002, which is an example time zone polygon (e.g., of the Pacific time zone). First location 2006 for mobile user device 2022 may be provided by location data source 112 (FIG. 1). At first location 2006, a time zone may be determined for mobile user device 2022 as described herein (e.g., with respect to flowchart 400 in FIG. 4).

According to step 1804 in FIG. 18, threshold region determiner 1902 may determine movement threshold region 1910 for mobile user device 2022, shown in FIG. 20 as first movement threshold region 2008. To make this determination, threshold region determiner 1902 may determine a distance between first location 2006 and a closest point along the edge of time zone polygon 2002, which is point 2004. The position of point 2004 may be determined from polygon attribute (shape data) information for time zone polygon 2002 received in time zone polygon shape data 1908, which may be included in time zone index file 120 or elsewhere. Accordingly, first movement threshold region 2008 may be established by threshold region determiner 1902 as a circle having a radius equal to the distance between first location 2006 and point 2004.

For instance, in one embodiment, threshold region determiner 1902 may check a predetermined number (e.g., 5000) of adjacent cells and calculate the distance from the mobile user device in the present time zone to the nearest point that lies in a different time zone. The number of cells to check may be selected so there is a high probability that the time zone boundary will lie within that number of cells. In this manner, threshold region determiner 1902 may find the time zone edge.

In another embodiment, threshold region determiner 1902 may perform a binary search on a radius value. Initially, the radius value may be set to be between zero and the circumference of earth divided by two (Ce/2). A number of iterations (e.g., about 20) may be looped. For each iteration, the radius value may be set to be an average of the current minimum and maximum radius values. Cells at a predetermined number of points (e.g., about 360) on that radius value is checked. If none of the points lie within a different time zone, it is assumed that the actual radius value is smaller than guessed. Otherwise, it is assumed that the actual radius is larger. The radius value is accordingly decreased or increased, and the next iteration is performed. In this manner, threshold region determiner 1902 may find the time zone edge.

In step 1806, movement of the mobile user device within the first movement threshold region is monitored. Trigger generator 1904 in FIG. 19 monitors movement of the mobile user device. As shown in FIG. 19, trigger generator 1904 receives movement threshold region 1910 and location information 122. In an embodiment, location information 122 is periodically updated by location data source 112 (e.g., a periodic points in time). When trigger generator 1904 receives updated location information 122, trigger generator 1904 is configured to compare the updated location information 122 to movement threshold region 1910, to determine whether the mobile user device has reached an edge of movement threshold region 1910.

In step 1808, a position change event is triggered based on an edge of the first movement threshold region being reached by the mobile user device. When trigger generator 1904 determines that the mobile user device has reached an edge of movement threshold region 1910, trigger generator 1904 issues a position change event 1912.

For example, with respect to FIG. 20, mobile user device 2022 moves along path 2016 from point 2006. When trigger generator 1904 determines that the edge of first movement threshold region 2008 is reached by mobile user device 2022, at point 2012, trigger generator 1904 triggers position change event 1912.

As shown in FIG. 19, TZ edge monitor 1906 receives position change event 1912. In response, TZ edge monitor 1906 is configured to determine whether an edge of the current time zone polygon (in which the mobile user device is/was contained) has been reached, and if so, to trigger an updated time zone determination to be made.

Figure 21:
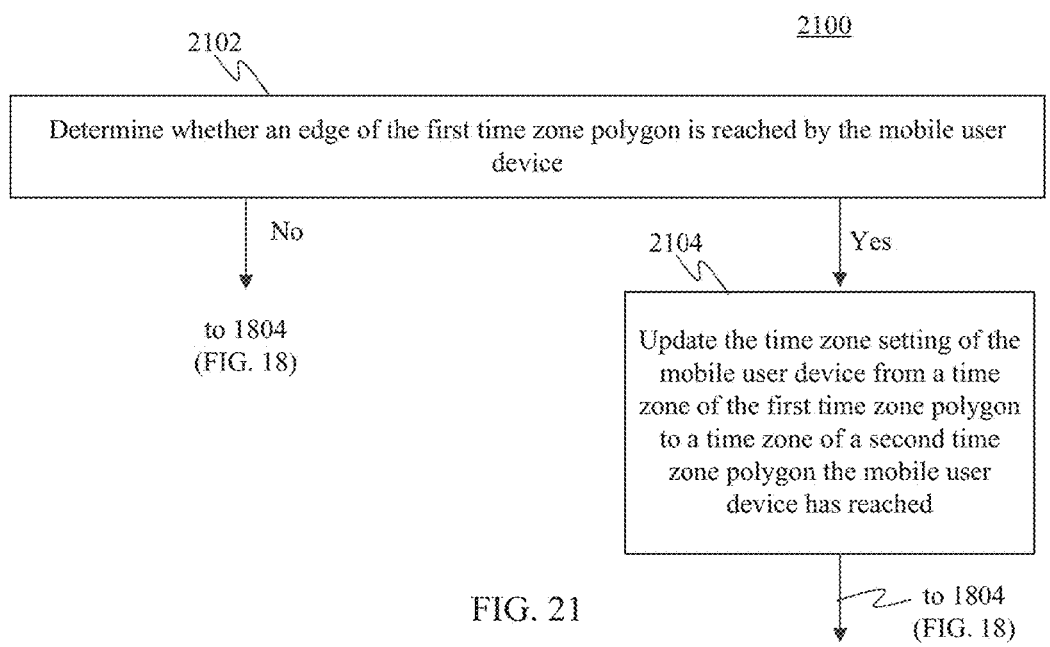
FIG. 21 shows a flowchart providing a process for determining when to update a local time zone setting, according to an example embodiment.

TZ edge monitor 1906 may operate in various ways, and may be configured in various ways to perform this function. For instance, in an embodiment, TZ edge monitor 1906 may operate according to FIG. 21. FIG. 21 shows a flowchart 2100 providing a process for determining when to update a local time zone setting, according to an example embodiment. Flowchart 2100 is described as follows with respect to TZ edge monitor 1906.

Flowchart 2100 begins with step 2102. Note that 2102 may be performed upon a position change event being triggered in step 1808 of FIG. 18. In step 2102, whether an edge of the first time zone polygon is reached by the mobile user device is determined. As shown in FIG. 19, TZ edge monitor 1906 receives position change event 1912, time zone polygon shape data 1908, and location information 122. When TZ edge monitor 1906 receives position change event 1912, TZ edge monitor 1906 is configured to compare the updated location information 122 to the boundaries of the current time zone polygon in time zone polygon shape data 1908, to determine whether the mobile user device has reached an edge of the current time zone polygon.

If the edge is not reached in step 2102, operation proceeds to step 1804 (FIG. 18). In step 1804, a new movement threshold region is determined, and movement of the mobile user device is again monitored (step 1806), etc. As shown in FIG. 19, TZ edge monitor 1906 may generate a new threshold region generate command 1914, which is received by threshold region determiner 1902. In such case, a new movement threshold region 1910 is determined by threshold region determiner 1902 based on a new location indicated in location information 122 and the nearest edge of the current time zone polygon, as determined from time zone polygon shape data 1908.

If the edge is reached in step 2102, operation proceeds from step 2102 to step 2104.

In step 2104, the time zone setting of the mobile user device is updated from a time zone of the first time zone polygon to a time zone of a second time zone polygon the mobile user device has reached. As shown in FIG. 19, TZ edge monitor 1906 may generate an update time zone command 1916. Update time zone command 1916 may be received by time zone determiner 114 in FIG. 15 (e.g., by coordinate generator 1502) as an instruction to re-determine the time zone in which the mobile device is located (e.g., according to flowchart 1400 in FIG. 14). Operation proceeds from step 2104 to step 1804 (FIG. 18).

For example, as described above with respect to FIG. 20, mobile user device 2022 had moved to point 2102, which had triggered position change event 1912. However, because mobile user device 2022 did not reach an edge of time zone polygon 2002, a second movement threshold region 2008 is generated for mobile user device 2022. Mobile user device 2022 may move along path 2016 from point 2012 until a new position change event 1912 is triggered at the point marked "3" in FIG. 20. At this point, a third movement threshold region is determined for mobile user device 2022 because an edge of time zone polygon 2002 is not yet reached.

This process continues until a fifth movement threshold region 2018 is determined for mobile user device 2022 at point 2024. When mobile user device 2022 continues along path 2016 to point 2020, another position change event 1912 is triggered. However, at point 2020, mobile user device 2022 has reached the edge of time zone polygon 2002. Accordingly, as described above, TZ edge monitor 1906 generates update time zone command 1916 to cause a new time zone to be determined for mobile user device 2022.

It is noted that trigger generator 1904 and/or TZ edge monitor 1906 may be configured to prevent excessive triggering/poling. For instance, mobile device users that reside near a time zone border, or drive along a time zone border, may experience excessive polling by repeatedly reaching the time zone border in a short period of time. To prevent excessive triggering/polling a threshold number of times (e.g., five or more times) within a first predetermined time period (e.g., five minutes), triggering/polling may be disabled/halted by trigger generator 1904 and/or TZ edge monitor 1906 until the triggering polling events stop for a second predetermined time period (e.g., 15 minutes), after which triggering/polling may be resumed.

Accordingly, in embodiments, trigger generator 1904 and/or TZ edge monitor 1906 may be configured to: determine a predetermined number of position change events within a first predetermined time period; and in response to determining the predetermined number of position change events within the predetermined time period, disable triggering of position change events for a second predetermined time period.

III. Example Mobile and Stationary Device Embodiments

Computer 102, computing device 104, computing device 126, time zone indexer 108, time zone determiner 114, TZ identifier determiner 502, polygon analyzer 504, duplicate remover 506, file encoder 508, envelope generator 802, cell discarder 804, cell identifier generator 806, SFC number generator 1002, superset generator 1302, superset sorter 1304, range filter 1306, coordinate generator 1502, index value generator 1504, index file searcher 1506, TZ setting updater 1508, SFC number calculator 1702, threshold region determiner 1902, trigger generator 1904, TZ edge monitor 1906, flowchart 200, flowchart 300, flowchart 400, flowchart 700, flowchart 1200, flowchart 1400, flowchart 1800, and flowchart 2100 may be implemented in hardware, or hardware combined with software and/or firmware. For example, time zone indexer 108, time zone determiner 114, TZ identifier determiner 502, polygon analyzer 504, duplicate remover 506, file encoder 508, envelope generator 802, cell discarder 804, cell identifier generator 806, SFC number generator 1002, superset generator 1302, superset sorter 1304, range filter 1306, coordinate generator 1502, index value generator 1504, index file searcher 1506, TZ setting updater 1508, SFC number calculator 1702, threshold region determiner 1902, trigger generator 1904, TZ edge monitor 1906, flowchart 200, flowchart 300, flowchart 400, flowchart 700, flowchart 1200, flowchart 1400, flowchart 1800, and/or flowchart 2100 may be implemented as computer program code/instructions configured to be executed in one or more processors and stored in a computer readable storage medium. Alternatively, time zone indexer 108, time zone determiner 114, TZ identifier determiner 502, polygon analyzer 504, duplicate remover 506, file encoder 508, envelope generator 802, cell discarder 804, cell identifier generator 806, SFC number generator 1002, superset generator 1302, superset sorter 1304, range filter 1306, coordinate generator 1502, index value generator 1504, index file searcher 1506, TZ setting updater 1508, SFC number calculator 1702, threshold region determiner 1902, trigger generator 1904, TZ edge monitor 1906, flowchart 200, flowchart 300, flowchart 400, flowchart 700, flowchart 1200, flowchart 1400, flowchart 1800, and/or flowchart 2100 may be implemented as hardware logic/electrical circuitry.

For instance, in an embodiment, one or more, in any combination, of time zone indexer 108, time zone determiner 114, TZ identifier determiner 502, polygon analyzer 504, duplicate remover 506, file encoder 508, envelope generator 802, cell discarder 804, cell identifier generator 806, SFC number generator 1002, superset generator 1302, superset sorter 1304, range filter 1306, coordinate generator 1502, index value generator 1504, index file searcher 1506, TZ setting updater 1508, SFC number calculator 1702, threshold region determiner 1902, trigger generator 1904, TZ edge monitor 1906, flowchart 200, flowchart 300, flowchart 400, flowchart 700, flowchart 1200, flowchart 1400, flowchart 1800, and/or flowchart 2100 may be implemented together in a SoC. The SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 22:
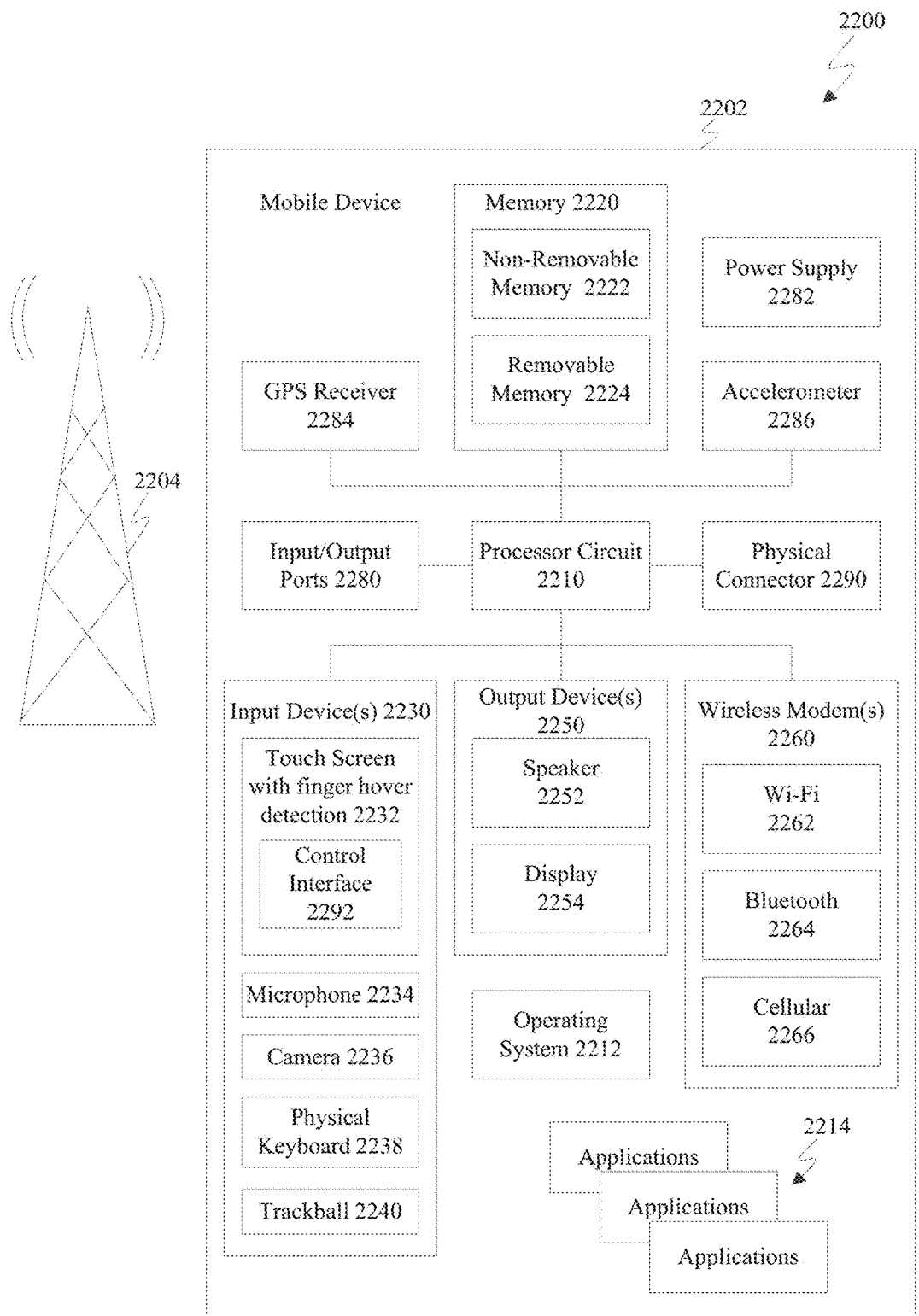
FIG. 22 shows a block diagram of an exemplary user device in which embodiments may be implemented.

FIG. 22 shows a block diagram of an exemplary mobile device 2200 including a variety of optional hardware and software components, shown generally as components 2202. For instance, components 2202 of mobile device 2200 are examples of components that may be included in computer 102, computing device 104, and/or computing device 126 in mobile device embodiments. Any number and combination of the features/elements of components 2202 may be included in a mobile device embodiment, as well as additional and/or alternative features/elements, as would be known to persons skilled in the relevant art(s). It is noted that any of components 2202 can communicate with any other of components 2202, although not all connections are shown, for ease of illustration. Mobile device 2200 can be any of a variety of mobile devices described or mentioned elsewhere herein or otherwise known (e.g., cell phone, smartphone, handheld computer, Personal Digital Assistant (PDA), etc.) and can allow wireless two-way communications with one or more mobile devices over one or more communications networks 2204, such as a cellular or satellite network, or with a local area or wide area network.

The illustrated mobile device 2200 can include a controller or processor referred to as processor circuit 2210 for performing such tasks as signal coding, image processing, data processing, input/output processing, power control, and/or other functions. Processor circuit 2210 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 2210 may execute program code stored in a computer readable medium, such as program code of one or more applications 2214, operating system 2212, any program code stored in memory 2220, etc. Operating system 2212 can control the allocation and usage of the components 2202 and support for one or more application programs 2214 (a.k.a. applications, "apps", etc.). Application programs 2214 can include common mobile computing applications (e.g., email applications, calendars, contact managers, web browsers, messaging applications) and any other computing applications (e.g., word processing applications, mapping applications, media player applications).

As illustrated, mobile device 2200 can include memory 2220. Memory 2220 can include non-removable memory 2222 and/or removable memory 2224. The non-removable memory 2222 can include RAM, ROM, flash memory, a hard disk, or other well-known memory storage technologies. The removable memory 2224 can include flash memory or a Subscriber Identity Module (SIM) card, which is well known in GSM communication systems, or other well-known memory storage technologies, such as "smart cards." The memory 2220 can be used for storing data and/or code for running the operating system 2212 and the applications 2214. Example data can include web pages, text, images, sound files, video data, or other data sets to be sent to and/or received from one or more network servers or other devices via one or more wired or wireless networks. Memory 2220 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

A number of programs may be stored in memory 2220. These programs include operating system 2212, one or more application programs 2214, and other program modules and program data. Examples of such application programs or program modules may include, for example, computer program logic (e.g., computer program code or instructions) for implementing time zone indexer 108, time zone determiner 114, TZ identifier determiner 502, polygon analyzer 504, duplicate remover 506, file encoder 508, envelope generator 802, cell discarder 804, cell identifier generator 806, SFC number generator 1002, superset generator 1302, superset sorter 1304, range filter 1306, coordinate generator 1502, index value generator 1504, index file searcher 1506, TZ setting updater 1508, SFC number calculator 1702, threshold region determiner 1902, trigger generator 1904, TZ edge monitor 1906, flowchart 200, flowchart 300, flowchart 400, flowchart 700, flowchart 1200, flowchart 1400, flowchart 1800, and/or flowchart 2200 (including any suitable step of flowcharts 200, 300, 400, 700, 1200, 1400, 1800, 2200), and/or further embodiments described herein.

Mobile device 2200 can support one or more input devices 2230, such as a touch screen 2232, microphone 2234, camera 2236, physical keyboard 2238 and/or trackball 2240 and one or more output devices 2250, such as a speaker 2252 and a display 2254. Touch screens, such as touch screen 2232, can detect input in different ways. For example, capacitive touch screens detect touch input when an object (e.g., a fingertip) distorts or interrupts an electrical current running across the surface. As another example, touch screens can use optical sensors to detect touch input when beams from the optical sensors are interrupted. Physical contact with the surface of the screen is not necessary for input to be detected by some touch screens. For example, the touch screen 2232 may be configured to support finger hover detection using capacitive sensing, as is well understood in the art. Other detection techniques can be used, as already described above, including camera-based detection and ultrasonic-based detection. To implement a finger hover, a user's finger is typically within a predetermined spaced distance above the touch screen, such as between 0.1 to 0.25 inches, or between 0.0.25 inches and 0.05 inches, or between 0.0.5 inches and 0.75 inches or between 0.75 inches and 1 inch, or between 1 inch and 1.5 inches, etc.

The touch screen 2232 is shown to include a control interface 2292 for illustrative purposes. The control interface 2292 is configured to control content associated with a virtual element that is displayed on the touch screen 2232. In an example embodiment, the control interface 2292 is configured to control content that is provided by one or more of applications 2214. For instance, when a user of the mobile device 2200 utilizes an application, the control interface 2292 may be presented to the user on touch screen 2232 to enable the user to access controls that control such content. Presentation of the control interface 2292 may be based on (e.g., triggered by) detection of a motion within a designated distance from the touch screen 2232 or absence of such motion. Example embodiments for causing a control interface (e.g., control interface 2292) to be presented on a touch screen (e.g., touch screen 2232) based on a motion or absence thereof are described in greater detail below.

Other possible output devices (not shown) can include piezoelectric or other haptic output devices. Some devices can serve more than one input/output function. For example, touch screen 2232 and display 2254 can be combined in a single input/output device. The input devices 2230 can include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 2212 or applications 2214 can comprise speech-recognition software as part of a voice control interface that allows a user to operate the device 2200 via voice commands. Further, device 2200 can comprise input devices and software that allows for user interaction via a user's spatial gestures, such as detecting and interpreting gestures to provide input to a gaming application.

Wireless modem(s) 2260 can be coupled to antenna(s) (not shown) and can support two-way communications between processor circuit 2210 and external devices, as is well understood in the art. The modem(s) 2260 are shown generically and can include a cellular modem 2266 for communicating with the mobile communication network 2204 and/or other radio-based modems (e.g., Bluetooth 2264 and/or Wi-Fi 2262). Cellular modem 2266 may be configured to enable phone calls (and optionally transmit data) according to any suitable communication standard or technology, such as GSM, 3G, 4G, 5G, etc. At least one of the wireless modem(s) 2260 is typically configured for communication with one or more cellular networks, such as a GSM network for data and voice communications within a single cellular network, between cellular networks, or between the mobile device and a public switched telephone network (PSTN).

Mobile device 2200 can further include at least one input/output port 2280, a power supply 2282, a satellite navigation system receiver 2284, such as a Global Positioning System (GPS) receiver, an accelerometer 2286, and/or a physical connector 2290, which can be a USB port, IEEE 1394 (FireWire) port, and/or RS-232 port. The illustrated components 2202 are not required or all-inclusive, as any components can be not present and other components can be additionally present as would be recognized by one skilled in the art.

Figure 23:
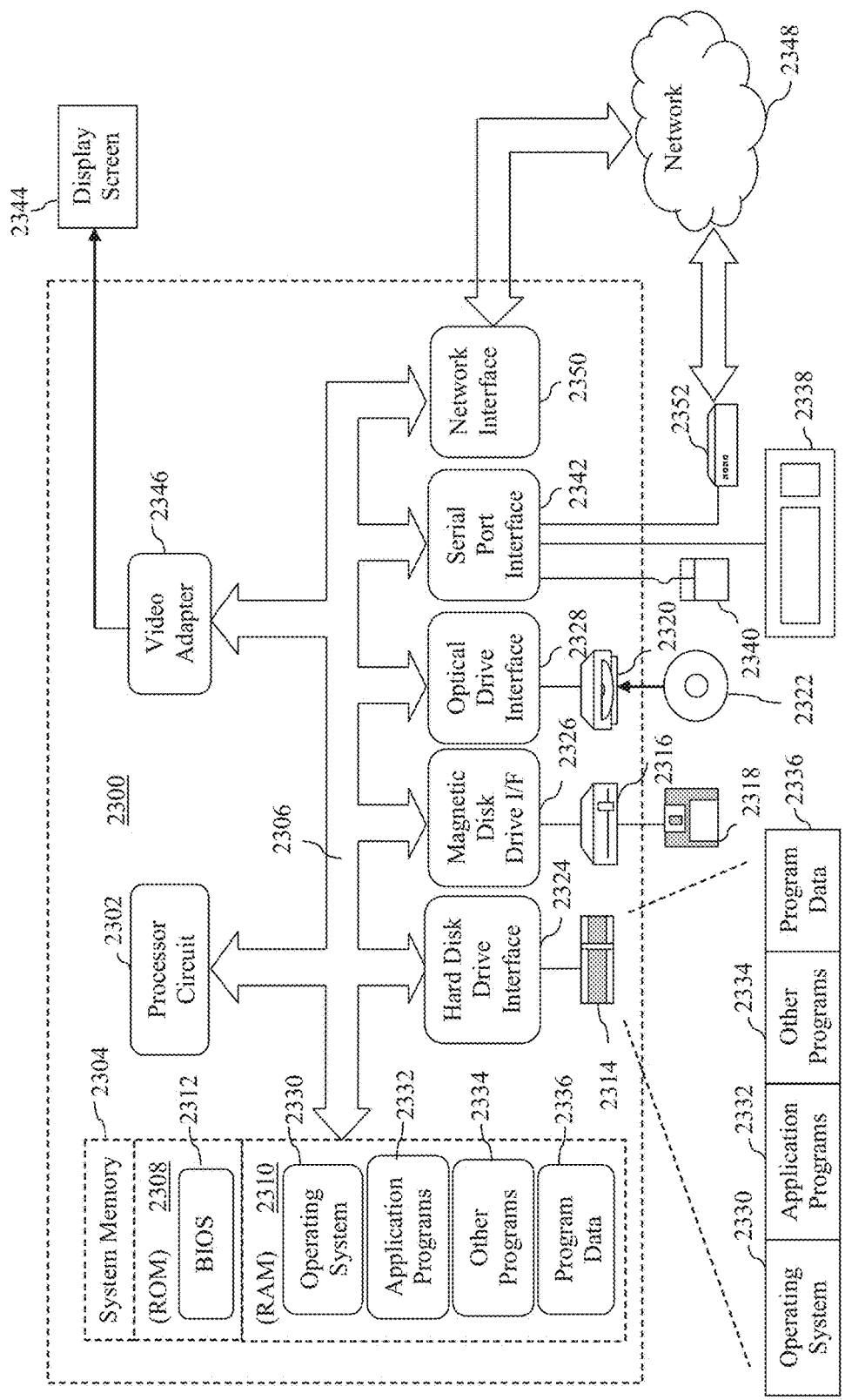
FIG. 23 shows a block diagram of an example computing device that may be used to implement embodiments.

Furthermore, FIG. 23 depicts an exemplary implementation of a computing device 2300 in which embodiments may be implemented. For example, computer 102, computing device 104, and/or computing device 126 may be implemented in one or more computing devices similar to computing device 2300 in stationary computer embodiments, including one or more features of computing device 2300 and/or alternative features. The description of computing device 2300 provided herein is provided for purposes of illustration, and is not intended to be limiting. Embodiments may be implemented in further types of computer systems, as would be known to persons skilled in the relevant art(s).

As shown in FIG. 23, computing device 2300 includes one or more processors, referred to as processor circuit 2302, a system memory 2304, and a bus 2306 that couples various system components including system memory 2304 to processor circuit 2302. Processor circuit 2302 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 2302 may execute program code stored in a computer readable medium, such as program code of operating system 2330, application programs 2332, other programs 2334, etc. Bus 2306 represents one or more of any of several types of bus structures, including a memory bus or memory controller, a peripheral bus, an accelerated graphics port, and a processor or local bus using any of a variety of bus architectures. System memory 2304 includes read only memory (ROM) 2308 and random access memory (RAM) 2310. A basic input/output system 2312 (BIOS) is stored in ROM 2308.

Computing device 2300 also has one or more of the following drives: a hard disk drive 2314 for reading from and writing to a hard disk, a magnetic disk drive 2316 for reading from or writing to a removable magnetic disk 2318, and an optical disk drive 2320 for reading from or writing to a removable optical disk 2322 such as a CD ROM, DVD ROM, or other optical media. Hard disk drive 2314, magnetic disk drive 2316, and optical disk drive 2320 are connected to bus 2306 by a hard disk drive interface 2324, a magnetic disk drive interface 2326, and an optical drive interface 2328, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 2330, one or more application programs 2332, other programs 2334, and program data 2336. Application programs 2332 or other programs 2334 may include, for example, computer program logic (e.g., computer program code or instructions) for implementing time zone indexer 108, time zone determiner 114, TZ identifier determiner 502, polygon analyzer 504, duplicate remover 506, file encoder 508, envelope generator 802, cell discarder 804, cell identifier generator 806, SFC number generator 1002, superset generator 1302, superset sorter 1304, range filter 1306, coordinate generator 1502, index value generator 1504, index file searcher 1506, TZ setting updater 1508, SFC number calculator 1702, threshold region determiner 1902, trigger generator 1904, TZ edge monitor 1906, flowchart 200, flowchart 300, flowchart 400, flowchart 700, flowchart 1200, flowchart 1400, flowchart 1800, and/or flowchart 2100 (including any suitable step of flowcharts 200, 300, 400, 700, 1200, 1400, 1800, 2100), and/or further embodiments described herein.

A user may enter commands and information into the computing device 2300 through input devices such as keyboard 2338 and pointing device 2340. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 2302 through a serial port interface 2342 that is coupled to bus 2306, but may be connected by other interfaces, such as a parallel port, game port, or a universal serial bus (USB).

A display screen 2344 is also connected to bus 2306 via an interface, such as a video adapter 2346. Display screen 2344 may be external to, or incorporated in computing device 2300. Display screen 2344 may display information, as well as being a user interface for receiving user commands and/or other information (e.g., by touch, finger gestures, virtual keyboard, etc.). In addition to display screen 2344, computing device 2300 may include other peripheral output devices (not shown) such as speakers and printers.

Computing device 2300 is connected to a network 2348 (e.g., the Internet) through an adaptor or network interface 2350, a modem 2352, or other means for establishing communications over the network. Modem 2352, which may be internal or external, may be connected to bus 2306 via serial port interface 2342, as shown in FIG. 23, or may be connected to bus 2306 using another interface type, including a parallel interface.

As used herein, the terms "computer program medium," "computer-readable medium," and "computer-readable storage medium" are used to refer to physical hardware media such as the hard disk associated with hard disk drive 2314, removable magnetic disk 2318, removable optical disk 2322, other physical hardware media such as RAMs, ROMs, flash memory cards, digital video disks, zip disks, MEMs, nanotechnology-based storage devices, and further types of physical/tangible hardware storage media (including memory 2220 of FIG. 22). Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 2332 and other programs 2334) may be stored on the hard disk, magnetic disk, optical disk, ROM, RAM, or other hardware storage medium. Such computer programs may also be received via network interface 2350, serial port interface 2342, or any other interface type. Such computer programs, when executed or loaded by an application, enable computing device 2300 to implement features of embodiments discussed herein. Accordingly, such computer programs represent controllers of the computing device 2300.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Example Embodiments

In one embodiment, a method in a computer comprises: receiving map data defining a world map as an array of polygons with associated time zones; determining a time zone identifier array based on the map data that includes a time zone identifier for each time zone identified in the map data; for each time zone, analyzing each polygon of the array of polygons included in the time zone to generate a set of cells associated with the time zone, thereby generating a plurality of sets of cells associated with the time zones; eliminating duplicate cell entries in the plurality of sets of cells associated with the time zones; and generating a time zone index file that includes the plurality of sets of cells with corresponding time zone identifiers.

In an embodiment, the determining a time zone identifier array comprises: determining the time zone identifier array to include time zone identifiers according to a first time zone data type; and mapping the time zone identifiers from a first time zone data type to a second time zone data type.

In an embodiment, for each time zone, the analyzing each polygon of the array of polygons included in the time zone to generate a set of cells associated with the time zone comprises: for each polygon, generating a rectangular envelope that surrounds the polygon and includes a grid of rectangular cells, a size of the cells based on an order value, discarding any cell of the grid that fails to intersect the polygon to generate a set of un-discarded cells, and generating a cell identifier for each cell in the set of un-discarded cells based on a space-filling curve, thereby generating a set of cell identifiers for the polygon; the sets of cell identifiers generated for the polygons of the array of polygons of the time zone forming the set of cells associated with the time zone.

In an embodiment, the generating a cell identifier for each cell in the set of un-discarded cells based on a space-filling curve comprises: generating a cell identifier for each cell in the set of un-discarded cells based on a Hilbert curve.

In an embodiment, the method further comprises: for each time zone, converting a format of the set of cells associated with the time zone to a set of ranges of cell identifiers.

In an embodiment, the eliminating duplicate cell entries in the plurality of sets of cells associated with the time zones comprises: combining the sets of ranges of cell identifiers associated with all time zones into a superset of ranges of cell identifiers for all time zones; sorting the superset of ranges of cell identifiers; for each cell having a cell identifier appearing in multiple ranges associated with time zones in the superset, determining a plurality of areas in the cell for time zones associated with a corresponding plurality of ranges of the superset that includes the cell identifier, determining which time zone has the largest of the areas in the cell, and deleting the cell identifier from the plurality of ranges in the superset other than the range associated with time zone determined to have the largest area in the cell.

In an embodiment, the method further comprises: refining the superset by discarding an ending cell identifier of each range, and adding an indication of gaps in cell identifiers in the superset.

In an embodiment, the method further comprises: providing the generated time zone index file to at least one computing device to use for time zone determination.

In another embodiment, a method in a computing device comprises: determining location information that indicates a location of the computing device; applying a space-filling curve to the location information to generate an index value; applying the index value to an index file previously generated by applying the space-filling curve to world map polygon shape data indicating time zones by location to determine a time zone for the location of the computing device; and updating a time zone setting of the computing device according to the determined time zone.

In an embodiment, the location information indicates the location as latitude and longitude values, said determining location information that indicates a location of the computing device comprising: converting to the latitude and longitude values to X and Y coordinates.

In an embodiment, the space-filling curve is a Hilbert curve, and said applying a space-filling curve to the location information to generate an index value comprises: calculating a Hilbert number for the X and Y coordinates to be the index value.

In an embodiment, the applying the index value to an index file comprises: scanning the index file to identify a range of cell identifiers that includes the Hilbert number; and identifying the time zone for the location of the computing device to be a time zone indicated in the index file as associated with the identified range.

In an embodiment, the method further comprises; replacing the index file with an updated index file generated by and received from a remote service.

In an embodiment, the method further comprises; performing said determining location information, applying a space-filling curve, applying the index value, and updating a time zone setting without the computing device being connected to a network.

In an embodiment, the method further comprises; performing said determining location information, applying a space-filling curve, applying the index value, and updating a time zone setting without the computing device transmitting the location information from the computing device.

In another embodiment, a method in a mobile user device comprises: receiving location information that indicates a first location of the mobile user device; determining a first movement threshold region as a portion of a first time zone polygon containing the first location of the mobile user device; monitoring movement of the mobile user device within the first movement threshold region; and triggering a position change event based on an edge of the first movement threshold region being reached by the mobile user device.

In an embodiment, the determining a first movement threshold region as a portion of a first time zone polygon containing the first location of the mobile user device comprises: determining the first movement threshold region to have a radius set to a first distance to a nearest edge of a first time zone polygon containing the first location of the mobile user device.

In an embodiment, the method further comprises: in response to said triggering, determining whether an edge of the first time zone polygon is reached by the mobile user device; if the edge of the first time zone polygon is determined to not be reached, determining a second movement threshold region as a second portion of the first time zone polygon containing an updated location of the mobile user device; or if the edge of the first time zone polygon is determined to be reached, updating the time zone setting of the mobile user device from a time zone of the first time zone polygon to a time zone of a second time zone polygon the mobile user device has reached.

In an embodiment, the determining a second movement threshold region as a second portion of the first time zone polygon containing an updated location of the mobile user device comprises: determining the second movement threshold region to have a radius set to a second distance to a nearest edge of the first time zone polygon.

In an embodiment, the method further comprises: determining a predetermined number of position change events within a first predetermined time period; and in response to said determining the predetermined number of position change events within the predetermined time period, disable triggering of position change events for a second predetermined time period.

In another embodiment, a computing device comprises: a location data source that provides location information that indicates a location of the computing device; at least one processor circuit; and at least one memory that stores program code configured to be executed by the at least one processor circuit, the program code comprising: an index value generator configured to apply a space-filling curve to the location information to generate an index value; an index file searcher configured to apply the index value to an index file previously generated by applying the space-filling curve to world map polygon shape data indicating time zones by location to determine a time zone for the location of the computing device; and a time zone setting updater configured to update a time zone setting of the computing device according to the determined time zone.

In another embodiment, a mobile user device comprises: a location data source that provides location information that indicates a location of the mobile user device; at least one processor circuit; and at least one memory that stores program code configured to be executed by the at least one processor circuit, the program code comprising: a threshold region determiner configured to determine a first movement threshold region as a portion of a first time zone polygon containing the location of the mobile user device; a trigger generator configured to monitor movement of the mobile user device within the first movement threshold region; and a time zone monitor configured to trigger a position change event based on an edge of the first movement threshold region being reached by the mobile user device.

V. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method in a computer, comprising:
  receiving map data defining a world map as an array of polygons with associated time zones;
  determining a time zone identifier array based on the map data that includes a time zone identifier for each time zone identified in the map data;
  for each time zone, analyzing each polygon of the array of polygons included in the time zone to generate a set of cells associated with the time zone, thereby generating a plurality of sets of cells associated with the time zones;
  eliminating duplicate cell entries in the plurality of sets of cells associated with the time zones; and
  generating a time zone index file that includes the plurality of sets of cells with corresponding time zone identifiers.

2. The method of claim 1, wherein said determining a time zone identifier array comprises:
  determining the time zone identifier array to include time zone identifiers according to a first time zone data type; and
  mapping the time zone identifiers from a first time zone data type to a second time zone data type.

3. The method of claim 1, wherein, for each time zone, said analyzing each polygon of the array of polygons included in the time zone to generate a set of cells associated with the time zone comprises:
  for each polygon,
    generating a rectangular envelope that surrounds the polygon and includes a grid of rectangular cells, a size of the cells based on an order value,
    discarding any cell of the grid that fails to intersect the polygon to generate a set of un-discarded cells, and
    generating a cell identifier for each cell in the set of un-discarded cells based on a space-filling curve, thereby generating a set of cell identifiers for the polygon;
  the sets of cell identifiers generated for the polygons of the array of polygons of the time zone forming the set of cells associated with the time zone.

4. The method of claim 3, wherein said generating a cell identifier for each cell in the set of un-discarded cells based on a space-filling curve comprises:
  generating a cell identifier for each cell in the set of un-discarded cells based on a Hilbert curve.

5. The method of claim 3, further comprising:
  for each time zone, converting a format of the set of cells associated with the time zone to a set of ranges of cell identifiers.

6. The method of claim 4, wherein said eliminating duplicate cell entries in the plurality of sets of cells associated with the time zones comprises:
  combining the sets of ranges of cell identifiers associated with all time zones into a superset of ranges of cell identifiers for all time zones;
  sorting the superset of ranges of cell identifiers;
  for each cell having a cell identifier appearing in multiple ranges associated with time zones in the superset,
    determining a plurality of areas in the cell for time zones associated with a corresponding plurality of ranges of the superset that includes the cell identifier,
    determining which time zone has the largest of the areas in the cell, and
    deleting the cell identifier from the plurality of ranges in the superset other than the range associated with time zone determined to have the largest area in the cell.

7. The method of claim 1, further comprising:
  providing the generated time zone index file to at least one computing device to use for time zone determination.

8. A computing device, comprising:
  a location data source that provides location information that indicates a location of the computing device;
  at least one processor circuit; and
  at least one memory that stores program code configured to be executed by the at least one processor circuit, the program code comprising:
    a time zone identifier determiner configured to receive map data defining a world map as an array of polygons with associated time zones, and to determine a time zone identifier array based on the map data that includes a time zone identifier for each time zone identified in the map data;
    a polygon analyzer configured to, for each time zone, analyze each polygon of the array of polygons included in the time zone to generate a set of cells associated with the time zone, thereby generating a plurality of sets of cells associated with the time zones;
a duplicate remover configured to eliminate duplicate cell entries in the plurality of sets of cells associated with the time zones; and
a file encoder configured to generate a time zone index file that includes the plurality of sets of cells with corresponding time zone identifiers.

9. The computing device of claim 8, wherein the time zone identifier determiner is further configured to:
determine the time zone identifier array to include time zone identifiers according to a first time zone data type; and
map the time zone identifiers from a first time zone data type to a second time zone data type.

10. The computing device of claim 8, wherein the polygon analyzer is further configured to:
for each polygon,
generate a rectangular envelope that surrounds the polygon and includes a grid of rectangular cells, a size of the cells based on an order value,
discard any cell of the grid that fails to intersect the polygon to generate a set of un-discarded cells, and
generate a cell identifier for each cell in the set of un-discarded cells based on a space-filling curve, thereby generating a set of cell identifiers for the polygon, the sets of cell identifiers generated for the polygons of the array of polygons of the time zone forming the set of cells associated with the time zone.

11. The computing device of claim 10, wherein the polygon analyzer is further configured to generate a cell identifier for each cell in the set of un-discarded cells based on a space-filling curve by generating a cell identifier for each cell in the set of un-discarded cells based on a Hilbert curve.

12. The computing device of claim 10, wherein the polygon analyzer is further configured to, for each time zone, convert a format of the set of cells associated with the time zone to a set of ranges of cell identifiers.

13. The computing device of claim 11, wherein, to eliminate duplicate cell entries, the duplicate remover is configured to:
combine the sets of ranges of cell identifiers associated with all time zones into a superset of ranges of cell identifiers for all time zones;
sort the superset of ranges of cell identifiers;
for each cell having a cell identifier appearing in multiple ranges associated with time zones in the superset,
determine a plurality of areas in the cell for time zones associated with a corresponding plurality of ranges of the superset that includes the cell identifier,
determine which time zone has the largest of the areas in the cell, and
delete the cell identifier from the plurality of ranges in the superset other than the range associated with time zone determined to have the largest area in the cell.

14. A computer-readable memory device having program code recorded thereon that when executed by at least one processor of a computing device causes the at least one processor to perform operations, the operations comprising:
receiving map data defining a world map as an array of polygons with associated time zones;
determining a time zone identifier array based on the map data that includes a time zone identifier for each time zone identified in the map data;
for each time zone, analyzing each polygon of the array of polygons included in the time zone to generate a set of cells associated with the time zone, thereby generating a plurality of sets of cells associated with the time zones;
eliminating duplicate cell entries in the plurality of sets of cells associated with the time zones; and
generating a time zone index file that includes the plurality of sets of cells with corresponding time zone identifiers.

15. The computer-readable memory device of claim 14, wherein the operation of determining a time zone identifier array comprises:
determining the time zone identifier array to include time zone identifiers according to a first time zone data type; and
mapping the time zone identifiers from a first time zone data type to a second time zone data type.

16. The computer-readable memory device of claim 14, wherein the operation of, for each time zone, analyzing each polygon of the array of polygons included in the time zone to generate a set of cells associated with the time zone comprises:
for each polygon,
generating a rectangular envelope that surrounds the polygon and includes a grid of rectangular cells, a size of the cells based on an order value,
discarding any cell of the grid that fails to intersect the polygon to generate a set of un-discarded cells, and
generating a cell identifier for each cell in the set of un-discarded cells based on a space-filling curve, thereby generating a set of cell identifiers for the polygon;
the sets of cell identifiers generated for the polygons of the array of polygons of the time zone forming the set of cells associated with the time zone.

17. The computer-readable memory device of claim 16 wherein the operation of generating a cell identifier for each cell in the set of un-discarded cells based on a space-filling curve comprises:
generating a cell identifier for each cell in the set of un-discarded cells based on a Hilbert curve.

18. The computer-readable memory device of claim 16 wherein the operations further comprise:
for each time zone, converting a format of the set of cells associated with the time zone to a set of ranges of cell identifiers.

19. The computer-readable memory device of claim 17, wherein the operation of eliminating duplicate cell entries in the plurality of sets of cells associated with the time zones comprises:
combining the sets of ranges of cell identifiers associated with all time zones into a superset of ranges of cell identifiers for all time zones;
sorting the superset of ranges of cell identifiers;
for each cell having a cell identifier appearing in multiple ranges associated with time zones in the superset,
determining a plurality of areas in the cell for time zones associated with a corresponding plurality of ranges of the superset that includes the cell identifier,
determining which time zone has the largest of the areas in the cell, and
deleting the cell identifier from the plurality of ranges in the superset other than the range associated with time zone determined to have the largest area in the cell.

20. The computer-readable memory device of claim 14, wherein the operations further comprise:
    providing the generated time zone index file to at least one computing device to use for time zone determination.

\* \* \* \* \*